(12) United States Patent
Wicker et al.

(10) Patent No.: US 12,036,608 B2
(45) Date of Patent: Jul. 16, 2024

(54) SPECTRAL EMISSIVITY AND TEMPERATURE MEASUREMENTS OF METAL POWDERS DURING CONTINUOUS PROCESSING IN POWDER BED FUSION ADDITIVE MANUFACTURING

(71) Applicant: Board of Regents, The University of Texas System, Austin, TX (US)

(72) Inventors: Ryan B. Wicker, El Paso, TX (US); Cesar A. Terrazas-Najera, El Paso, TX (US); Alfonso Fernandez, El Paso, TX (US); Ralph Felice, Macedonia, OH (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/643,313

(22) Filed: Dec. 8, 2021

(65) Prior Publication Data
US 2022/0176455 A1    Jun. 9, 2022

Related U.S. Application Data

(60) Provisional application No. 63/122,749, filed on Dec. 8, 2020.

(51) Int. Cl.
*B22F 10/80*       (2021.01)
*B22F 10/28*       (2021.01)
(Continued)

(52) U.S. Cl.
CPC .............. *B22F 10/80* (2021.01); *B22F 10/28* (2021.01); *B22F 12/41* (2021.01); *B22F 12/49* (2021.01);
(Continued)

(58) Field of Classification Search
CPC .... B22F 10/20; B22F 10/28; B22F 10/30–31; B22F 10/36; B22F 10/364; B22F 10/368;
(Continued)

(56) References Cited

U.S. PATENT DOCUMENTS

| | | | | |
|---|---|---|---|---|
| 5,520,371 A | * | 5/1996 | Miller | B22F 9/082 222/603 |
| 5,898,522 A | * | 4/1999 | Herpst | G02B 7/007 359/511 |

(Continued)

FOREIGN PATENT DOCUMENTS

| | | | | |
|---|---|---|---|---|
| WO | WO-8202092 A | * | 6/1982 | G01J 5/60 |
| WO | WO-2020083531 A1 | * | 4/2020 | B22F 10/20 |

OTHER PUBLICATIONS

"Multi-Wavelength Pyrometers," 2020. Williamson Infrared (Year: 2020).*

(Continued)

*Primary Examiner* — Alexandra M Moore
(74) *Attorney, Agent, or Firm* — Yee & Associates, P.C.

(57) ABSTRACT

A method of measuring spectral emissivity of materials is provided. The method comprises placing material in a controlled chamber and exposing the material to an energy source to heat the material. At least one multi-wavelength pyrometer measures the spectral emissivity of the material produced by heating by the energy source, wherein the multi-wavelength pyrometer is positioned at a distal end of a tube extending from the chamber, wherein the tube provides a sacrificial surface for vapor condensation to prevent the vapor condensation from obscuring a view port used by the pyrometer.

20 Claims, 26 Drawing Sheets

(51) Int. Cl.
| | |
|---|---|
| *B22F 12/41* | (2021.01) |
| *B22F 12/49* | (2021.01) |
| *B22F 12/90* | (2021.01) |
| *B33Y 50/00* | (2015.01) |
| *G01J 5/00* | (2022.01) |
| *G01J 5/04* | (2006.01) |
| *B33Y 10/00* | (2015.01) |
| *G01N 21/3563* | (2014.01) |
| *G02B 27/00* | (2006.01) |

(52) U.S. Cl.
CPC .............. *B22F 12/90* (2021.01); *B33Y 50/00* (2014.12); *G01J 5/0003* (2013.01); *G01J 5/042* (2013.01); *B22F 2201/10* (2013.01); *B22F 2201/20* (2013.01); *B22F 2203/11* (2013.01); *B33Y 10/00* (2014.12); *G01J 2005/0074* (2013.01); *G01N 21/3563* (2013.01); *G02B 27/0006* (2013.01)

(58) Field of Classification Search
CPC .... B22F 10/37; B22F 10/38; B22F 10/80–85; B22F 12/00; B22F 12/90; B33Y 10/00; B33Y 30/00; B33Y 50/00; B33Y 50/02; G01N 21/35; G01N 21/3563
See application file for complete search history.

(56) References Cited

U.S. PATENT DOCUMENTS

| | | | |
|---|---|---|---|
| 6,379,038 | B1 | 4/2002 | Felice |
| 9,044,827 | B2* | 6/2015 | Song .................... B23K 26/123 |
| 2013/0101803 | A1* | 4/2013 | Grebe .................. B29C 64/129 |
| | | | 264/497 |
| 2016/0224017 | A1* | 8/2016 | Huang .................... B22F 12/90 |
| 2019/0039183 | A1* | 2/2019 | Morton ................ B23K 26/034 |

OTHER PUBLICATIONS

Ackelid, Ulf. "What gives the cleanest environment—inert gas or high vacuum?" 2020. Freemelt (Year: 2020).*
Schwerdtfeger et al. In situ flaw detection by IR-imaging during electron beam melting. Rapid Prototyping Journal vol. 18 No. 4 (2012) 259-263 (Year: 2012).*
Boone et al., "Thermal near infrared monitoring system for electron beam melting with emissivity tracking," Additive Manufacturing, Issue 22, Jun. 2018, pp. 601-605.
Dinwiddie et al., "Calibrating IR cameras for in-situ temperature measurement during the electron beam melt processing of Inconel 718 and Ti—Al6—V4," SPIE Commercial + Scientific Sensing and Imaging, 2016, Baltimore, Maryland, 12 pages.
Rodriguez et al., "Approximation of absolute surface temperature measurements of powder bed fusion additive manufacturing technology using in situ infrared thermography," Additive Manufacturing, Issue 5, 2015, pp. 31-39.

* cited by examiner

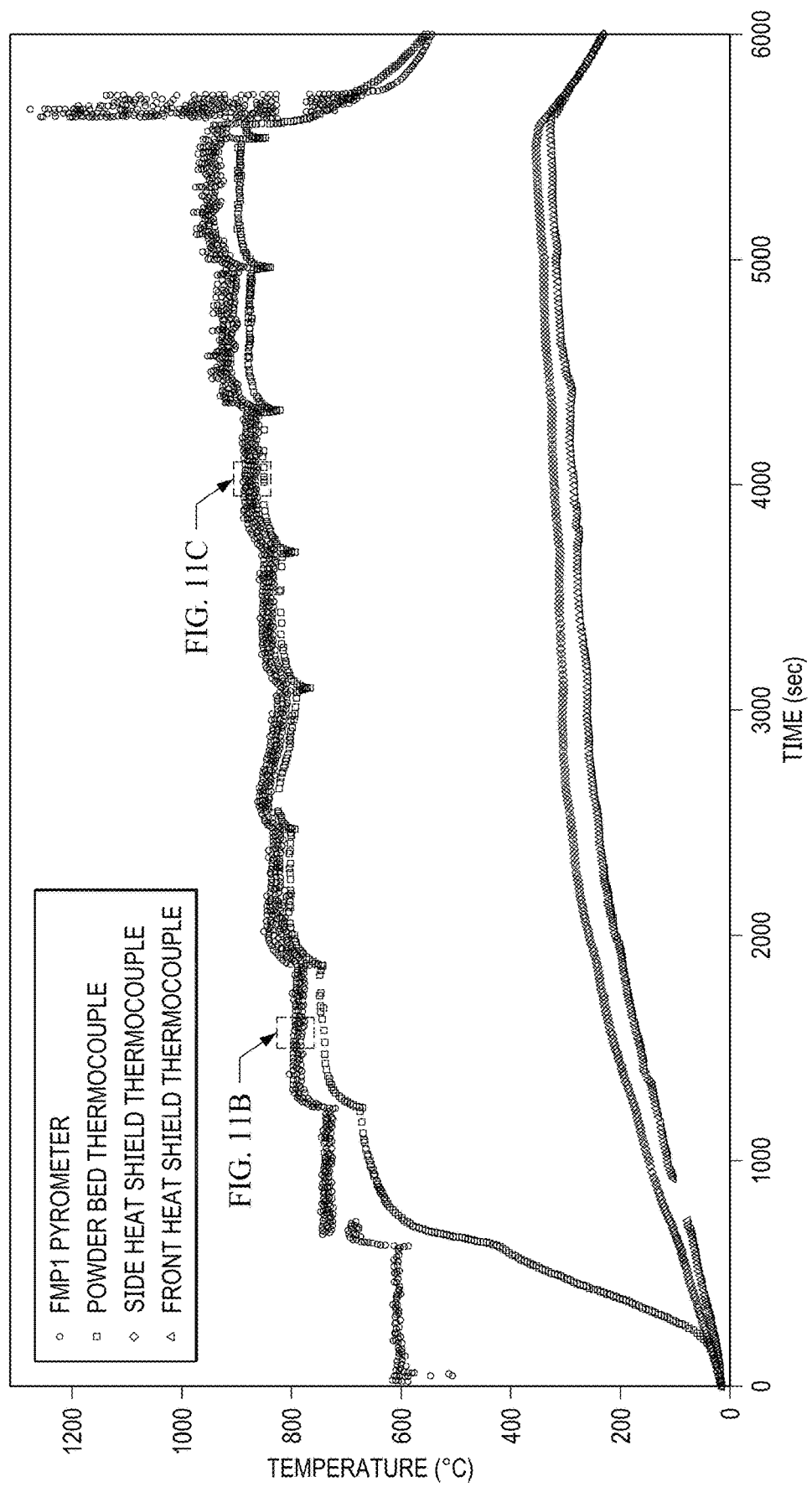

SPECTRAL EMISSIVITY AND TEMPERATURE MEASUREMENTS OF METAL POWDERS DURING CONTINUOUS PROCESSING IN POWDER BED FUSION ADDITIVE MANUFACTURING

BACKGROUND INFORMATION

1. Field

The present disclosure relates to additive manufacturing, and more specifically to dynamic measurement of spectral emissivity and temperature of metal powders processed (heated, melted, solidified, and cooled) during processing in powder bed fusion.

2. Background

In recent years, powder bed fusion (PBF) additive manufacturing (AM) methods have been gaining popularity for use in various applications spanning medicine, aerospace, and defense. PBF, including laser powder bed fusion (L-PBF) and electron beam powder bed fusion (EB-PBF) techniques have progressively seen enhancements in performance through the addition of increased capabilities such as higher power of the heat source (i.e. laser or electron beam), larger processing envelopes, and a growing catalog of materials. Despite this progress, much research is still focused on establishing robust techniques for monitoring that can enable feedback and control, and that can ultimately serve for quality assurance and process repeatability.

Of the several process variables that can be monitored during PBF, temperature is arguably the most important as it provides a direct indication of the thermo-mechanical history during processing of a given component being produced. However, accurate surface temperature measurements of the powder bed in PBF processes remains elusive, mainly because radiation thermometry measurement methods rely on a priori knowledge of the emissivity for the target being measured. Furthermore, emissivity varies with bulk chemistry, surface chemistry, phase, temperature, morphology of the emitting surface, and wavelength of the emitted radiation. Also affecting the emitted spectrum are the sensor spectral response and orientation to the emitting surface, environmental conditions between the surface and sensor, and other factors that make measuring accurate temperatures difficult.

Therefore, it would be desirable to have a method and apparatus that take into account at least some of the issues discussed above, as well as other possible issues.

SUMMARY

An illustrative embodiment provides a method of measuring spectral emissivity of materials. The method comprises placing material in a controlled chamber and exposing the material to an energy source to heat the material. Emitted thermal radiation from the material produced by heating by the energy source is measured with at least one multi-wavelength pyrometer.

Another illustrative embodiment provides a method of measuring temperature of materials. The method comprises placing material in a controlled chamber and exposing the material to an energy source to heat the material. Emitted thermal radiation from the material produced by heating by the energy source is measured with at least one multi-wavelength pyrometer.

Another illustrative embodiment provides an apparatus for measuring spectral emissivity or temperature of materials. The apparatus comprises: a controlled chamber configured to hold material, wherein the controlled chamber is vacuum controlled or filled with an inert gas; an energy source to heat the material; and at least one multi-wavelength pyrometer that measures emitted thermal radiation from the material produced by heating by the energy source, wherein the multi-wavelength pyrometer is positioned at the distal end of a tube extending from the chamber, wherein the tube provides a sacrificial surface for vapor condensation to prevent the vapor condensation from obscuring a view port used by the pyrometer.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11A depicts a graph of temperature values acquired by the multi-wavelength, thermocouple embedded in the copper powder bed, and thermocouple attached to the side heat shield during successive preheating steps in accordance with an illustrative embodiment;

DETAILED DESCRIPTION

Figure 1:
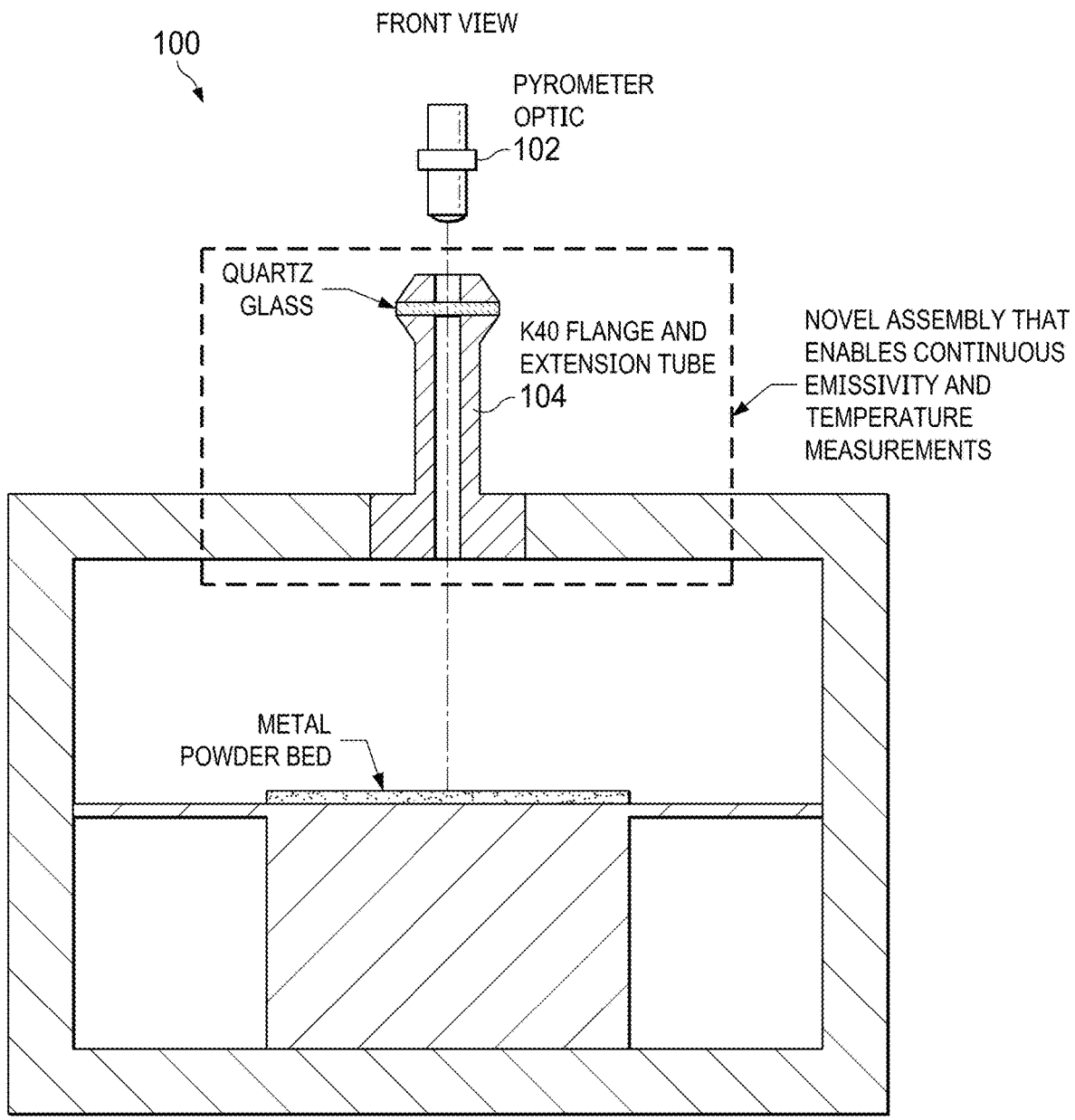
FIG. 1 illustrates an apparatus using a multi-wavelength pyrometer in an electron beam powder bed fusion system to carry out continuous measurements of thermal signatures using a sight tube in accordance with an illustrative embodiment.

The illustrative embodiments recognize and take into account one or more different considerations. For example, the illustrative embodiments recognize and take into account that of the several process variables that can be monitored during PBF, temperature is arguably the most important as it provides a direct indication of the thermo-mechanical history during processing of a given component being produced.

The illustrative embodiments also recognize and take into account that temperature monitoring gains even more relevance for EB-PBF since processing conditions are kept at an elevated temperature by preheating using the electron beam. Preheating of the layers during the Arcam EB-PBF process helps maintain the operating temperature elevated, providing stability to the powder bed (required to keep the particles stationary while being bombarded with electrons) through lightly sintering or consolidation of the powder particles, while also having the benefit of reducing residual stresses in the components produced. Preheating also leads to elevated temperature conditions throughout the build that directly impacts microstructure and mechanical performance of the fabricated components. For example, EB-PBF processing of Ti6Al4V requires preheating of the powder bed to a temperature of ~730° C. which results in natural aging of the material. Hence, the ability to acquire accurate temperature and other thermal signatures from the powder bed can be used for enhancing process control, helping to achieve process repeatability, and leading to quality assurance while producing components using PBF and L-PBF processes.

The illustrative embodiments also recognize and take into account that radiation thermometry methods including near infrared (NIR) and infrared (IR) imaging, as well as other radiation thermometry methods, have been used extensively to monitor apparent temperature within the EB-PBF process. However, the elevated temperature environment, the processing under vacuum (i.e. $2.0^{-3}$ mBar), and the non-equilibrium solidification conditions, make process monitoring challenging. For example, the elevated vacuum restricts the use of electronic devices that might require shielding through active cooling and pressurization to function inside the processing chamber. The high vacuum also results in vaporization and condensation of light alloying elements (i.e. aluminum) that can occlude non-shielded viewports used for observations. The use of feedthrough passes for electrical sensors (thermocouples) is also feasible; however, the use of thermocouples requires contact with the material under study, which presents challenges for use in PBF AM especially at the surface of the part being fabricated that experience high temperatures (1660° C. for Ti6Al4V) and a dynamic melt and solidification environment.

Responding to these limitations, temperature monitoring of this process using non-contact methods has been carried out employing externally installed setups with dynamic viewport shielding. For example, the work by Rodriguez et al. described the implementation of IR thermography through a Zinc-Selenide (ZnSe) window protected by a shutter mechanism in an Arcam A2 EB-PBF system. This setup was used to approximate part surface temperatures and enabled operators to perform changes in processing parameters to homogenize temperatures for various parts built in a single setup. Subsequent work with the same experimental setup, along with a custom developed software interface, demonstrated automatic process control to enact parameter changes that influenced temperature and microstructure of the fabricated parts.

Other similar works have described near IR thermography to correlate the presence of defects in the deposited layers with areas of high heat radiation or to perform in situ metrology through comparison of geometrical features in each layer with the expected geometries from the original computer aided design (CAD) model. A method using mid-wave IR cameras was presented by Dinwiddie et al. for online monitoring in EB-PBF that included calibration procedures to account for loss in transmittance through the lead glass and Kapton film used to protect the optical path. Their results included mathematical expressions that were used to obtain the surface emittance of sintered powder and of the as deposited metal for calibration of IR thermographs during monitoring of Ti6Al4V and Inconel 718 builds. Building upon those results, the work by Rapple et al. presented a method to calibrate temperature profiles extracted from thermographic data accounting for the change in emittance or emissivity during preheating and melting in EB-PBF. The method was then employed to approximate the thermal gradient and the velocity at the solidification interface and compared with microstructural quantifications of grain size and morphology. Similarly, recent work by Boone et al. presented a method for NIR imaging in EB-PBF using a borescope that permitted continuous imaging of the process. Using this methodology, the authors carried out an emissivity correction for the measured temperatures. Boone et al.'s method used direct image segmentation of an area containing approximate melt-pool dimensions unto which values of emissivity were assigned depending on whether the material was considered melted or unmelted. However, this study provided no details of the actual emissivity values used nor how the segmentation of the area corresponding to the melted material was performed. Irrespective of the method, as will be shown in more detail below, emissivity of the process is time-dependent (due to the dynamic process), temperature-dependent, and wavelength dependent, among other factors, suggesting that any method that assigns a single value for emissivity to the material (spatially or temporally) will increase uncertainties in the accuracies of the measurements.

In the studies referenced, the advantage of the IR thermography approach—the ability to image large sections of the powder bed—was highlighted. This is different from other non-contact devices deployed in PBF AM that are limited to measuring thermal signatures in small regions. For most IR cameras (employing either photon or thermal detectors) and brightness pyrometry systems, the emissivity of the target must be prescribed and its value remains constant throughout observations, when in fact, emissivity behaves dynamically for most materials, as it is influenced by several material and environment factors. The evolving emissivity during the phase changes experienced in PBF AM is a significant challenge that can introduce substantial error in measurements, with temperature discrepancies that can span tens to hundreds of degrees. For example, a 90 K difference was described between corrected and uncorrected temperatures in the study by Boon et al. The work described by Raplee et al. highlighted the effects on accuracy for IR imaging following melting, where thermographs without emissivity correction showed regions that experienced a decrease in temperature after melting anywhere from 50° C. to 100° C. Finally, a drastic impact resulting from uncorrected emissivity values was described by Rodriguez et al. during monitoring EB-PBF processing of Ti6Al4V. The work reported by Rodriguez et al. showed variations in measured temperature that could be in excess of 300° C. As acknowledged by Murphy and Forrest, the correction methods described in research, such as those reviewed above, fall short given that emissivity correction should be dynamic. The inventors agree with Murphy's and Forrest's assessment, since the emissivity for a given target also varies dynamically responding to properties of the target that include its morphology and topography, surface and bulk chemistry, phase, and temperature, and also on the observation conditions such as the spectral range (or wavelength of the emission), atmosphere (the environmental conditions through which the radiation is transmitting), and the angle of measurement, to mention a few. The dynamic behavior of emissivity and other properties is expected to be exacerbated during the non-equilibrium processing conditions experienced in PBF AM.

The method of the illustrative embodiments illustrates the spectral dependence of emissivity experienced during dynamic processing and particularly under conditions experiences during PBF processing of materials. Therefore, emissivity must be known to accurately use non-contact radiation thermometry methods. The illustrative embodiments dynamically measure spectral emissivity over approximately 1000 nm-1640 nm during PBF processing. With this emissivity information, it can be determined if other non-contact temperature measurement methods can be used in particular ranges.

The illustrative embodiments provide a novel approach, employing a multi-spectral or multi-wavelength (MW) pyrometer, to measure thermal signatures including temperature and spectral emissivity values for a region of a preheated powder bed. In one embodiment a pyrometer is placed at 15° from the normal of the powder bed, and emissivity values are measured for a small region of a copper powder bed preheated in an Arcam A2 EB-PBF system. However, it should be noted that the method of the illustrative embodiments can be applied to other pyrometer configurations (described below) as well as other materials and any powder material used in metal powder-based additive manufacturing to characterize the material in question for processing. In addition, in one embodiment, the MW pyrometry is configured to measure a target within the controlled environment within a glovebox. This setup allows for measurement of powder materials as well as virtually any material surface that can be heated to within the measurement range of the MW pyrometer (300° C. to 2000° C. or up to 4000° C. in some configurations). In addition, it should be well understood by those skilled in the art that the powder material being processed in any of the embodiments will undergo a transformation depending on its temperature that may include heating to a liquid followed by subsequent cooling to a solid surface). By determining the spectral response of a material, MW pyrometry can be used (possibly in combination with IR detection where MW pyrometry can be used to determine when IR pyrometry may be appropriate as well as calibrate the IR measurements) to make accurate temperature measurements.

The illustrative embodiments include a solution to prevent metallization of the viewport thus enabling near-continuous measurements throughout the length of the experiment without signal decay. This solution represents a significant inventive step to overcome the problem of metallization observed in prior methods using a MW pyrometer in EB-PBF, which resulted in degradation of the intensity signals acquired by the device. For the experiment presented here, the preheating of the copper powder bed was performed through direct scanning of the surface with the electron beam. The temperature of the powder bed was elevated and sustained in a total of nine preheating steps by progressively increasing the electrical current delivered to the beam (in increments of 5 mA). After preheating, seven successive melting steps were also carried out in an area enclosing the small region observed by the pyrometer, enabling the capture of the thermal signatures during phase transitions from powder (sintered) to liquid to solid. The temperature values reported by the pyrometer were compared with those from a type-K thermocouple available in the Arcam A2 EB-PBF system. Although the overall temperature trends for both devices were consistent, a faster response was achieved through the MW pyrometer, which also recorded higher temperatures at each preheating step. More importantly, this study provides in-process measurements of emissivity as the temperature of the powder bed was progressively increased from room temperature (22° C.) up to ~900° C., and also during seven consecutive melting steps. Raw data captured by the MW pyrometer was used to construct plots of the spectral emissivity of the material during nine preheating steps, and enabled observation of the melting behavior, and of the emissivity change of the material during heating, melting, and cooling. The measurement of the spectral response of emissivity for materials during processing conditions is a fundamental contribution that, to the knowledge of the authors, has not been previously addressed in PBF AM. Although future work will aim to understand and minimize the sources of uncertainty in the measurements reported, the results obtained indicate the dynamic (i.e. variable) nature of the emissivity and thus the non-graybody behavior for the copper powder employed. This non-gray behavior has been seen in solid and liquid metal materials and alloys typically used in PBF AM, such as solid Inconel 718, pure liquid titanium and solid Ti6Al4V, further suggesting potential shortfalls associated with many of the thermal measurements reported in the AM literature. Enhancing the accuracy of radiation thermometry measurements can positively impact process control, component qualification, and the validation of computational models used to simulate PBF processes—all serving to motivate the embodiments of the current inventive technologies and methods described in more detail in the following.

FIG. 1 illustrates an apparatus 100 using a multi-wavelength pyrometer 102 in an electron beam powder bed fusion system to carry out continuous measurements of thermal signatures using a sight tube 104 in accordance with an illustrative embodiment. The sight tube 104 prevents metallization of the viewport leading to continuous measurements. The novel assembly shown in FIG. 1 enables continuous emissivity and temperature measurements by providing a setup for materials spectral characterization in-situ using a PBF process to heat, melt and solidify materials with different physical aspects (powder, liquid, solid form).

Figure 2A:
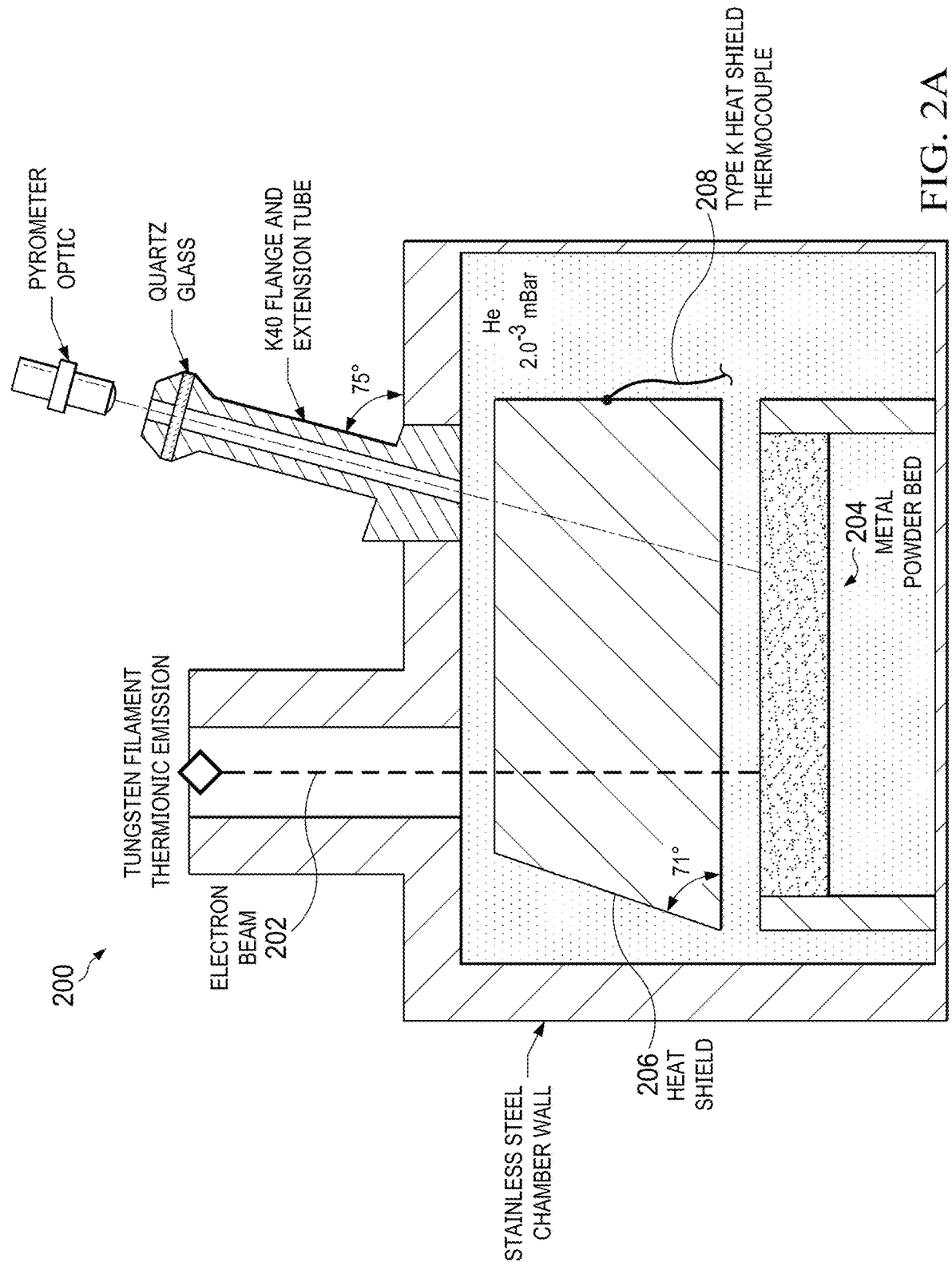
FIG. 2A illustrates an apparatus using an electron beam to heat the powder bed for measuring emissivity and temperature of materials to characterize the materials for use in powder bed fusion in accordance with an illustrative embodiment.

FIG. 2A illustrates an apparatus 200 using an electron beam 202 to heat a bed of powder for measuring emissivity and temperature of materials to characterize the materials for use in powder bed fusion in accordance with an illustrative embodiment.

The powder bed preheating experiments were performed in an Arcam EB-PBF A2 system (Arcam AB, Sweden). The A2 system operates at a voltage potential of 60 kV with a maximum power of 3 kW and can attain a beam diameter that can continuously vary from 200 μm to 1000 μm. The A2 system has the ability to run in a high vacuum (i.e. $10^{-6}$ mBar); however, the regular EB-PBF process runs under a controlled vacuum of $2.0 \times 10^{-3}$ mBar through a constant helium bleed, which were the conditions used in the experiments described here in support of several embodiment illustrations and demonstrations. An enclosure of brushed stainless-steel walls (called the heat shield 206) is used during the process to reduce heat losses through radiation reflection into the bed of powder. The A2 system has a single grounded HKQIN-116G type-K thermocouple 208 (Omega Engineering, CT, USA), with a probe length of 24 inches, that is used as temperature feedback. This thermocouple 208 has a standard accuracy of 0.75% of the temperature measured, for any temperature above 0° C., as reported by the manufacturer. During a normal build, the thermocouple is set in contact with the bottom of a metal plate that rests on the powder bed and is used as the fabrication substrate. The temperature readings from this thermocouple provide feedback throughout a build, informing and controlling the process using a proprietary algorithm. However, one inventive step overcome by the current invention is the ability to measure the emissivity and temperature of the surface of the part under fabrication throughout a build, whereas the thermocouple technique is fixed to the location underneath the build plate (located most closely to the bottom of the part). The work presented here did not use a metal plate as a starting substrate. Instead, a leveled copper powder bed 204 was prepared having the thermocouple embedded 208 in it and located ~100 μm underneath the top surface of the bed.

Figure 3:
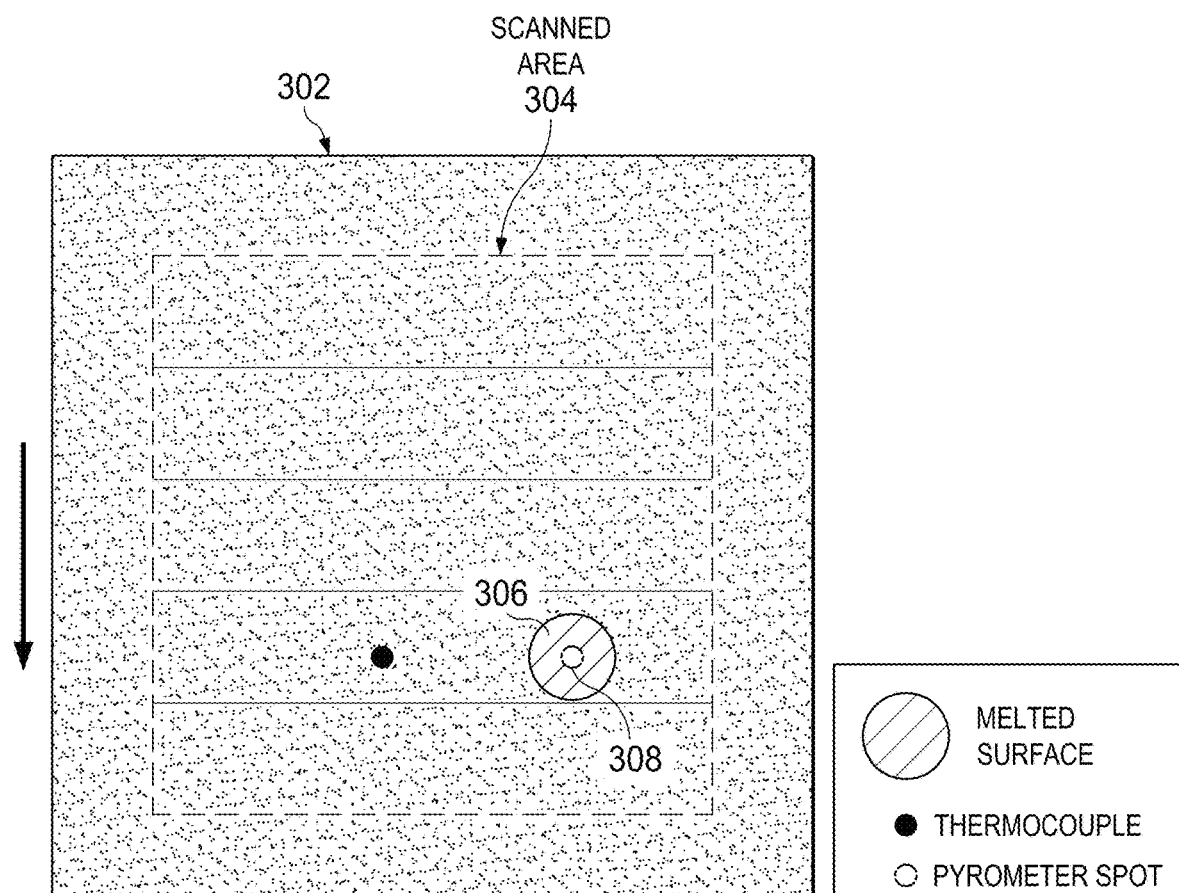
FIG. 3 illustrates a top plan view of a preheat strategy over a powder bed in accordance with an illustrative embodiment.

FIG. 3 illustrates a top plan view of a preheat strategy over a powder bed in accordance with an illustrative embodiment. In the Arcam EB-PBF process, preheating of the start plate and of every layer is carried out by scanning with a defocused electron beam using a snake pattern that alternates its direction left to right or front to back after reaching a set number of scan repetitions. Several parameters of the electron beam dynamically interact to control the scanning strategy. Depending on the material and size of the substrate to be preheated, different values of beam current (mA), focus offset (mA), and beam speed (mm/s) are employed. Other parameters that control scanning include the line offset (mm), and two dimensionless numbers consisting of the number of repetitions and the line order parameter. Contiguous beam scan lines are separated by the value entered for the line order parameter. With the use of these parameters, the powder bed preheating is carried out more uniformly. Depending on the orientation of the scanning, a visual effect is created during the preheat, in which horizontal lines appear to move from front to back, whereas vertical lines move left to right of the powder bed.

In the experiment performed in this work, gradual heating of the powder bed 302 was accomplished using a custom preheating strategy involving fixed step increases of the beam current in a total of nine steps. The preheating steps were carried out in an area 304 measuring 135 mm×135 mm through direct scanning of the powder bed 302 using the electron beam. The nominal parameters used for the electron beam were 25,000 mm/s beam speed, 80 mA focus offset, 1.2 mm of line offset and 20 for the line order parameter, based on preheat theme for Ti6Al4V recommended by Arcam for 50 μm layers, with the exception of the beam current. The beam current was varied from 5 mA to 45 mA in increments of 5 mA corresponding to the nine preheating steps used. Each preheating step was timed and lasted ten minutes.

After the last preheating step (beam current of 45 mA) was completed, a series of seven consecutive melting steps were carried out on a circular region 306 with a diameter of 20 mm that enveloped the region (~2.65 mm diameter spot 308) being measured by the MW pyrometer. The pyrometer measurement region 308 was selected to be approximately concentric with the circular area 306 being melted. These seven consecutive melting steps were used to examine the ability of the MW pyrometer to track the melt process and did not include deposition of layers of powder in between melts nor the preheating step between melts normally used to fabricate parts. This approach was used to maintain observation of the same material over the experiment. The process parameters employed for melting of the copper powder were a beam speed of 500 mm/s, current and maximum current values of 10 mA, and focus offset of 20 mA. A speed function value of 15 and a top surface temperature of 390° C. were used based on parameters reported by Lodes et al. It should be noted that the above is only provided as an illustrative example. Those of skill in the art will recognize other heating methods that can be applied within the context of the illustrative embodiments.

Figure 4:
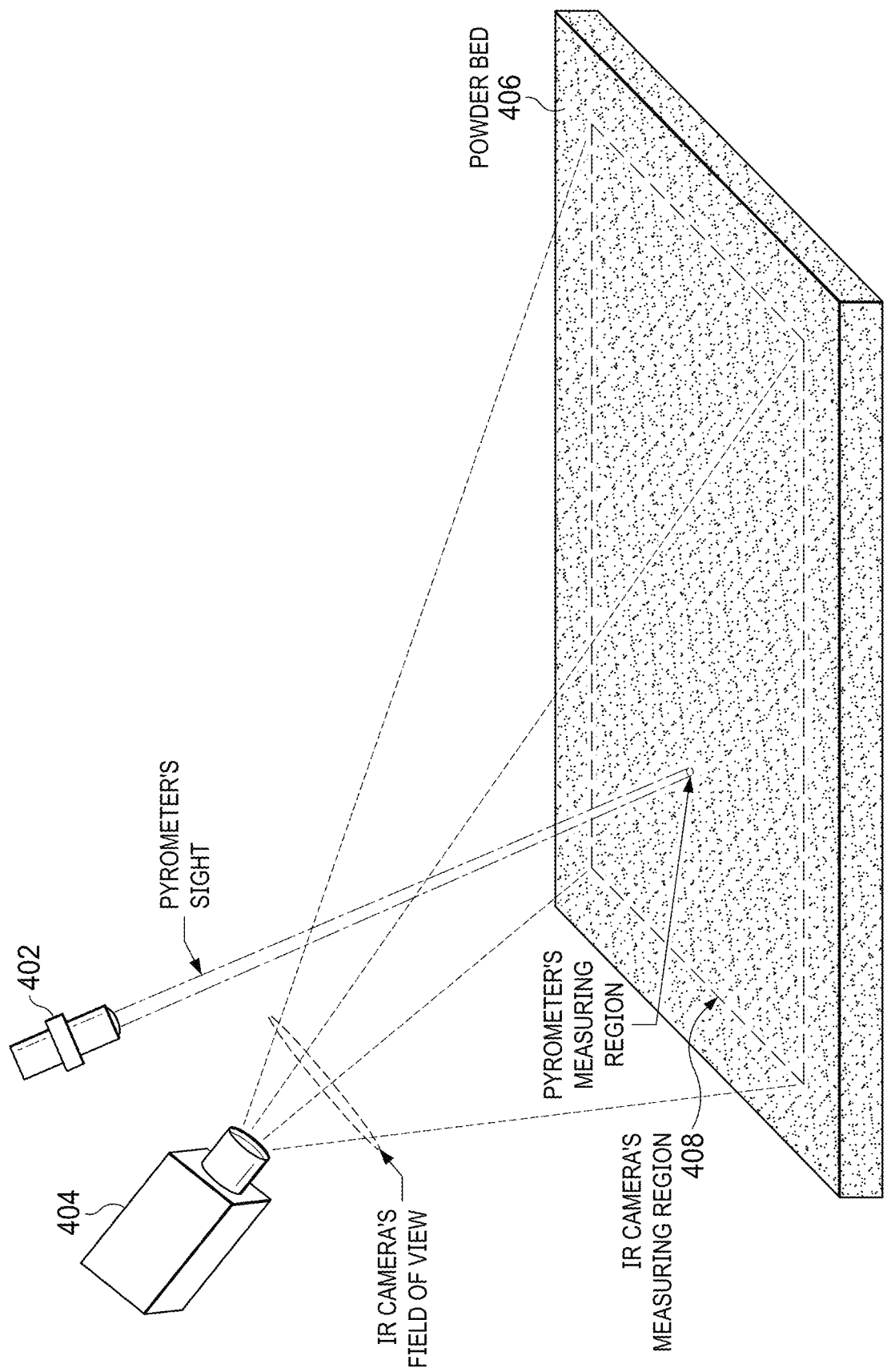
FIG. 4 illustrates an apparatus using both a multi-wavelength pyrometer and an infrared camera in conjunction to measure emissivity and temperature in accordance with an illustrative embodiment.

FIG. 4 illustrates an apparatus using both a multi-wavelength pyrometer 402 and an infrared (IR) camera 404 in conjunction to measure emissivity and temperature in accordance with an illustrative embodiment. In an embodiment, the IR camera 404 has a spectrum of ~1 to 1.7 μm. For example, the IR camera might be an A6260 InGaAs camera manufactured by FLIR Systems, Inc. The multi-wavelength pyrometer 402 provides measures of spectral emissivity for a specimen 406 fixed in a location of the build envelope, that is then used to indicate when IR imaging is appropriate and can be performed. The spectral emissivity measurements from the MW pyrometer 402 can be used to determine, for example, when the emissivity exhibits gray-body behavior across the spectral range of the IR camera 404, thus helping establish when the IR camera can be appropriately used to estimate surface temperature. The spectral emissivity measurements effectively complement and help validate the full field of view 408 observations made using the IR camera. In addition, the temperature measured using the MW pyrometer can be used to calibrate the temperature measurement of the IR camera.

Figure 5:
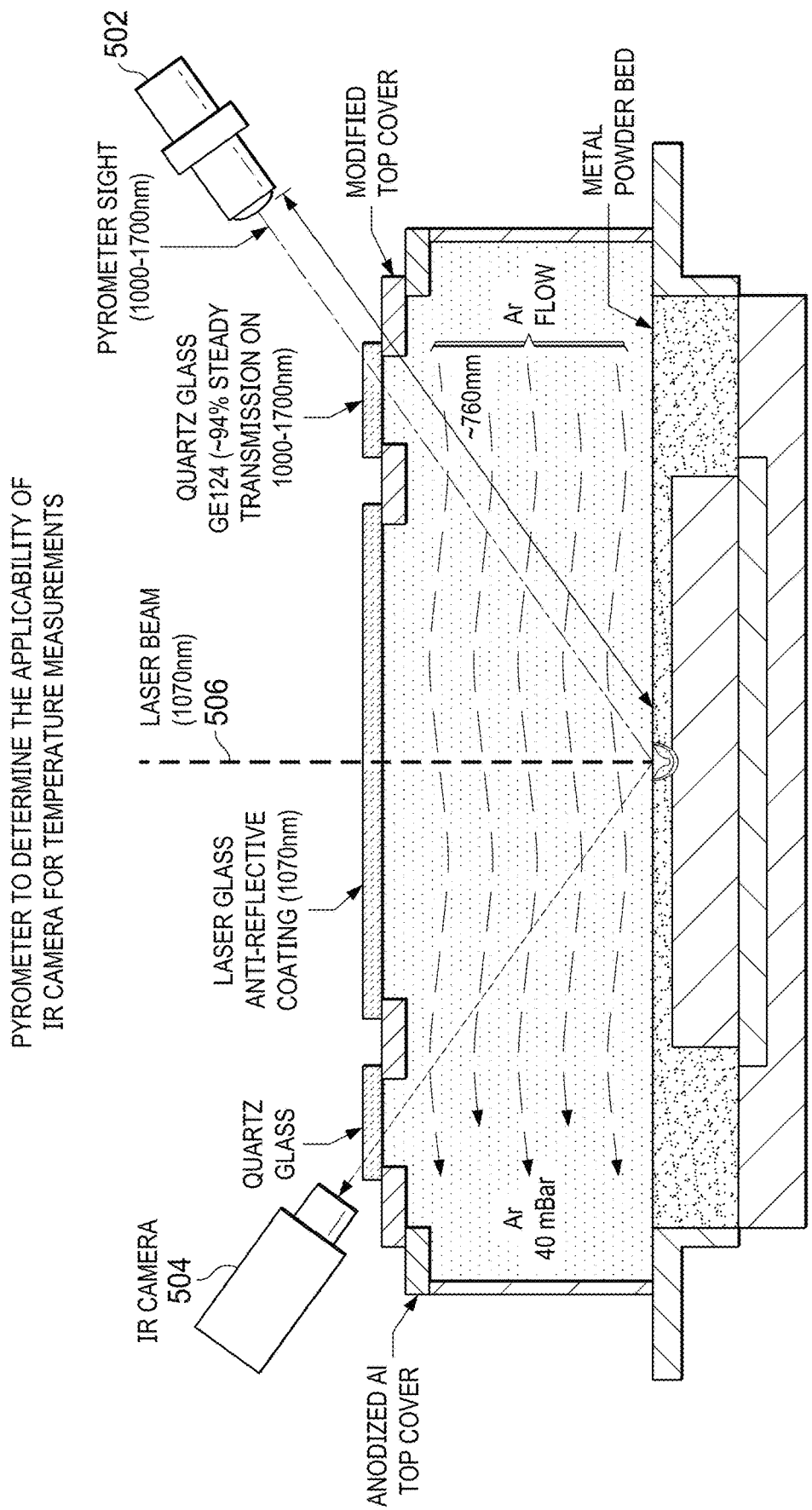
FIG. 5 illustrates an apparatus for measuring emissivity and temperature during laser powder bed fusion in accordance with an illustrative embodiment.

FIG. 5 illustrates an apparatus for measuring emissivity and temperature during laser powder bed fusion in accordance with an illustrative embodiment. This embodiment uses an off-axis, MW pyrometer 502 to monitor a single spot during L-PBF with the ability to extract thermal signatures and does not involve the use of a sight-tube. This embodiment might optionally include an off-axis IR camera 504 in conjunction with the MW pyrometer 502, as shown. The pyrometer 502 can be calibrated to filter a range of wavelengths emitted by the laser 506 to eliminate false emissivity readings caused by reflected laser photons. Calibration may be performed in software and/or by using optical filters. The MW pyrometer 502 captures the spectral response of the material and helps validate and indicate the suitability of IR observations. In essence, the MW pyrometer 502 serves as a quality control for the IR camera 504 while also serving as an independent accurate measurement system (spectral emissivity and temperature) for laser PBF processing.

Figure 6:
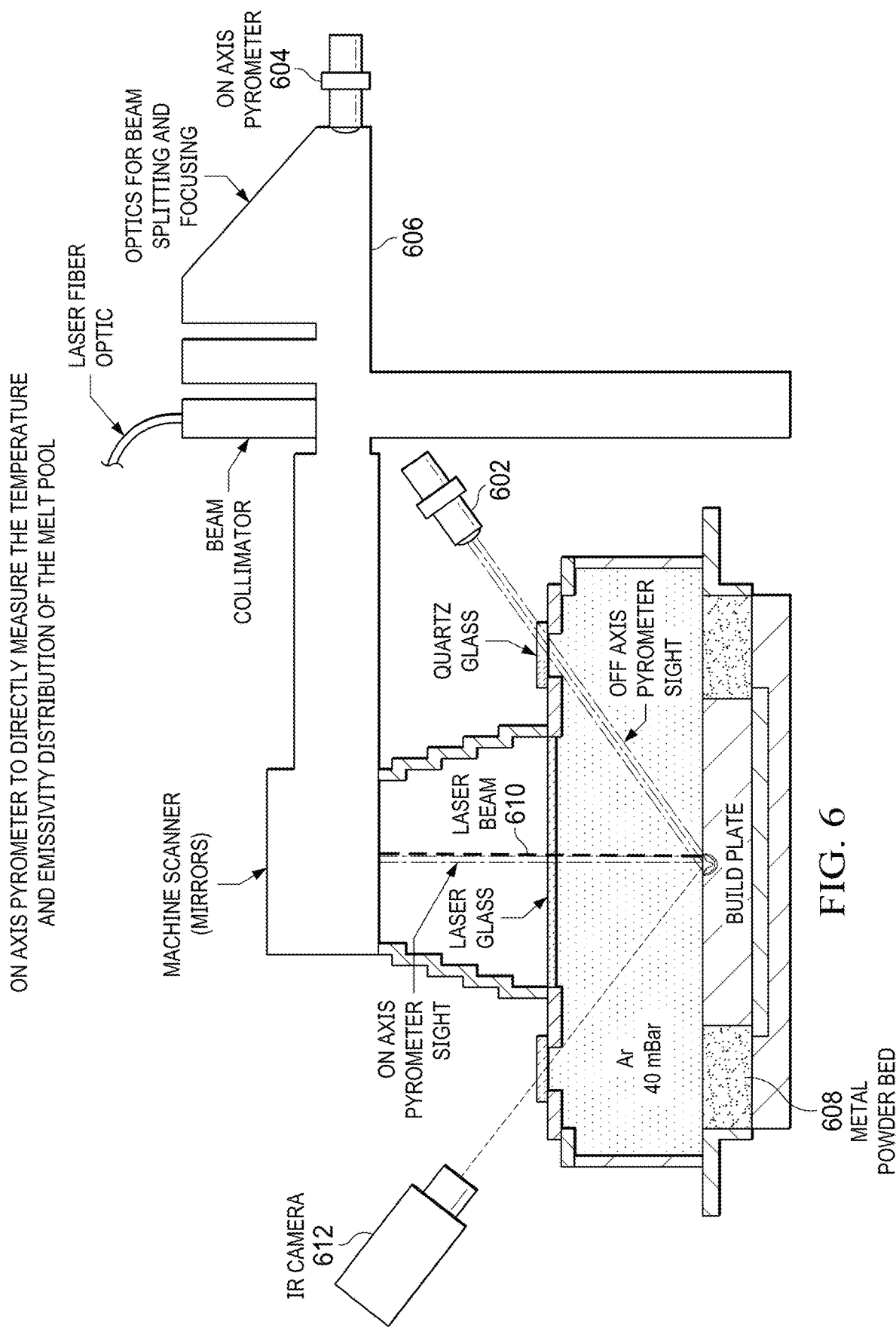
FIG. 6 illustrates an apparatus for measuring emissivity and temperature using both off-axis and on-axis multi-wavelength pyrometers in accordance with an illustrative embodiment.

FIG. 6 illustrates an apparatus for measuring emissivity and temperature using both off-axis 602 and on-axis 604 multi-wavelength pyrometers in accordance with an illustrative embodiment. The on-axis pyrometer 604 is mounted on a scanning head 606 and is able to scan the whole surface of the powder bed 608 in conjunction with the laser 610. The scanning system can be the same scanning system used by the laser and/or a separate, independent scanning system that is optionally synchronized with the laser scanning system. In a preferred embodiment, the MW pyrometer 604 has its own scanning system (for accurate calibration and configuration purposes) that is synchronized with the laser scanning system. The optical path may be configured to be most optimum for the wavelengths of the MW pyrometer 604, which can be different from the most optimum for the wavelength of the laser 610. Synchronization means the location of the MW pyrometer 604 can be timed to co-locate its measurement with the laser beam 610 on the surface of the material being processed in the L-PBF system. Synchronization further means the MW pyrometer 604 can be timed to dynamically position itself at any location relative to the laser beam 610, so it can be set to track the laser beam before or after the beam, set to pause intermittently to make a measurement, or perform virtually any programmed step to perform measurements. By using the on-axis (in-line) MW pyrometer 604 in L-PBF, this embodiment enables directly measuring the temperature of the melt-pool or radiation emitted in the vicinity of the melt pool, including the potential variation of emissivity as a function of process variables including material temperature, scanning strategy, material, etc.

As shown in FIG. 6, the on-axis MW pyrometer 604 can be used in conjunction with an off-axis pyrometer 602 and IR camera 612.

Figure 7A:
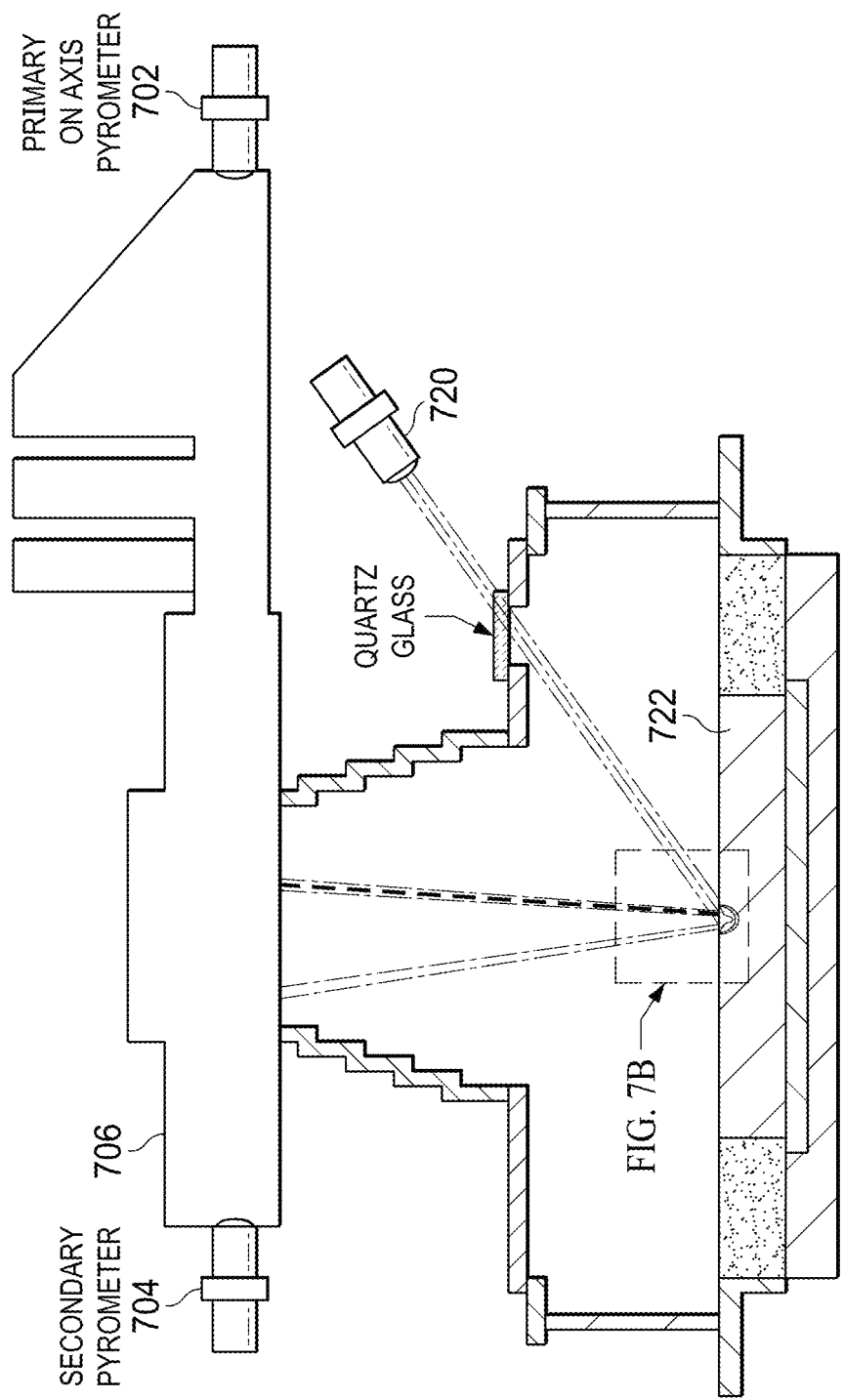
FIG. 7A illustrates an apparatus using an on-axis multi-wavelength pyrometer and a secondary pyrometer on a second scanning head to measure emissivity and temperature from two different regions in accordance with an illustrative embodiment.
Figure 7B:
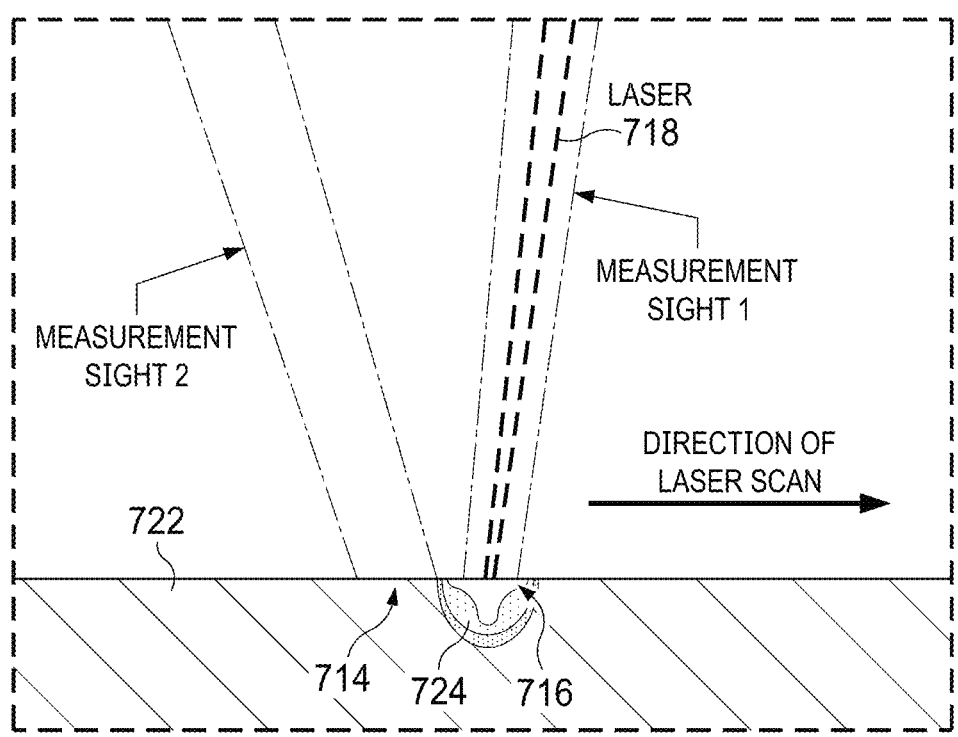
FIG. 7B illustrates measuring emissivity and temperature at two locations relative to a scanning laser beam using a primary on-axis pyrometer and second pyrometer in accordance with the illustrative embodiment show in FIG. 7A.

FIG. 7A illustrates an apparatus using an on-axis multi-wavelength pyrometer 702 and a secondary pyrometer 704 on a second scanning head 706 to measure emissivity and temperature from two different regions in accordance with an illustrative embodiment. FIG. 7B illustrates measuring emissivity and temperature at two locations 714, 716 relative to a scanning laser beam 718 using a primary on-axis pyrometer 702 and second pyrometer 704 in accordance with the illustrative embodiment show in FIG. 7A.

The use of multiple laser scan heads (e.g., available in the Aconity MIDI+ system) enables new applications for enhancing monitoring and process understanding. Concurrent observation of the laser 718/melt-pool 724 with the on-axis pyrometer 702 and the pyrometer 704 on the secondary scan head 706 that closely follows the location of the first pyrometer 702 enables cross-validation of measurements. The secondary pyrometer 704 can operate in different manners. The secondary pyrometer 704 might look directly at the melt-pool 724 concurrently with the on-axis pyrometer 702 such that both scan heads look at the same location in the powder bed 722. The secondary pyrometer 704 might trail the laser 718/melt-pool 724, following a straight line or other trajectory, including counter to the trajectory of the laser 718. The secondary pyrometer 704 might also initially follow the melt-pool 724 then stop at a prescribed location to measure transient thermal effects. Separating the secondary pyrometer 704 from the laser 718 allows optimization for the MW pyrometer 704 to ensure the radiation path is optimized for the measurement wavelengths for the MW pyrometer and not necessarily for the laser.

The off-axis pyrometer 720 shown in FIG. 7A looks at a witness coupon throughout the entire build, while the on-axis pyrometer 702 and secondary pyrometer 704 perform measurements in the manners described above.

Beyond the ability to characterize the spectral response of the material, the configuration in FIG. 7A enables measurement of unprecedented signatures including thermal gradient, cooling rates, sintering temperatures, phase changes, surface morphology changes, and associated changes in properties such as emissivity and other temperature related thermodynamic properties, and potentially to measure solidification rates. Cooling rates and spectral emissivity can be measured in L-PBF processes by tracking the beam path, e.g., using dual scanner array setups.

Figure 8:
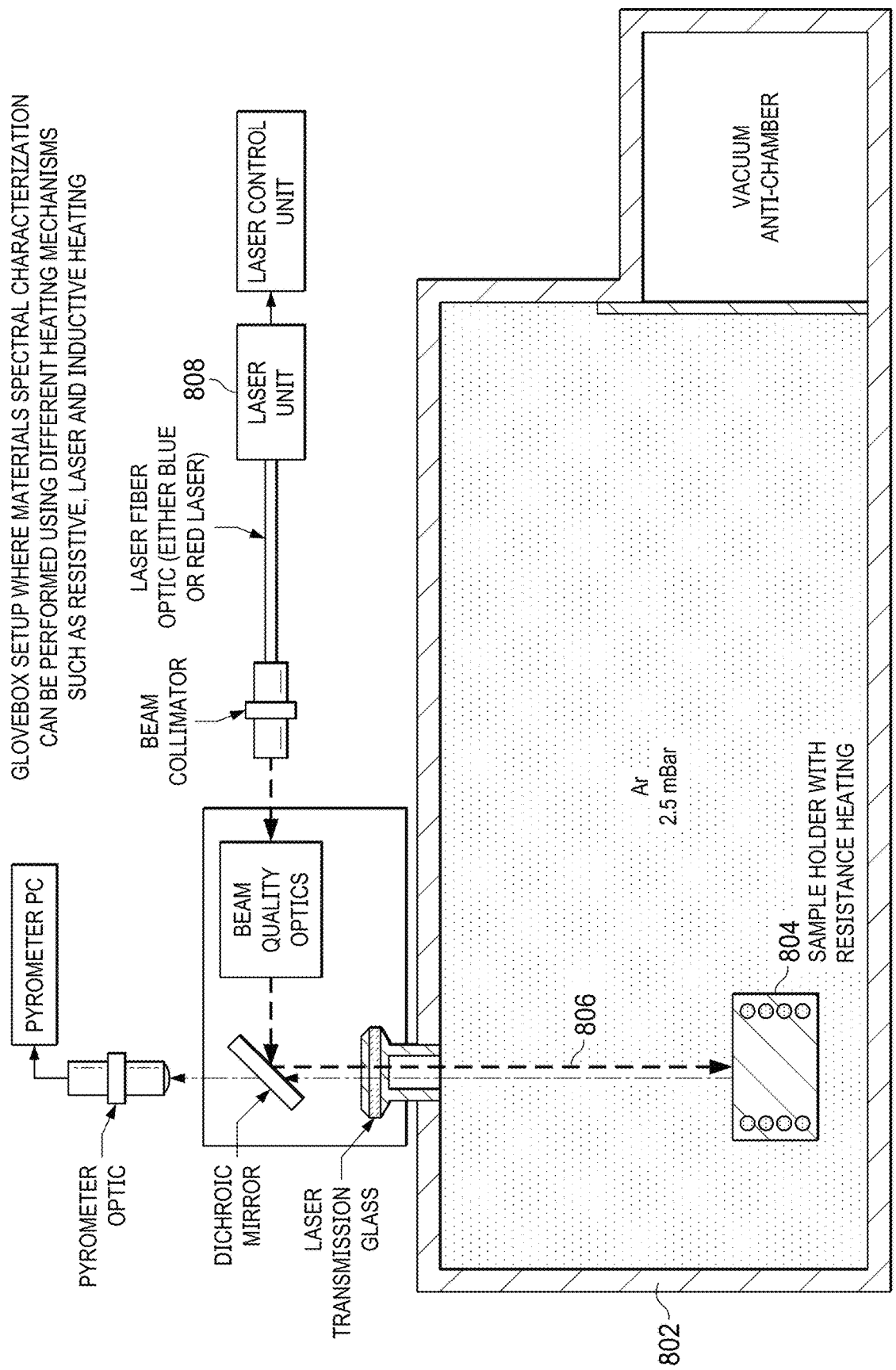
FIG. 8 illustrates a "glovebox" apparatus for measuring emissivity and temperature during heating of materials that may replicate process conditions of laser powder bed fusion in accordance with an illustrative embodiment.

FIG. 8 illustrates a "glovebox" apparatus for measuring emissivity and temperature during heating of materials that may replicate process conditions of laser powder bed fusion in accordance with an illustrative embodiment. The apparatus can also be used irrespective of PBF processing to determine spectral emissivity of materials (i.e. powder and solid materials in the temp ranges of the MW pyrometers). Materials in the glovebox 802 can be: metal powder, a metal solid structure (e.g., elemental metal, metal alloy, or metal composite material), ceramics, and any material that can be operated in the temperature range of the MW pyrometer (e.g., 300° C. up to 2000° C. but up to 4000° C. in some configurations). The material in the glovebox 802 may be tested in solid and liquid phases. The glovebox 802 can be atmosphere controlled with the admission of inert gases while various heating methods are employed, including, e.g., laser heating, resistance heating, and induction heating among others. These different heating methods can be used to heat up powder and solid materials while continuous measurements are obtained with the MW pyrometer.

The glovebox 802 can be purged using Argon to maintain levels of oxygen below 1 ppm using ultra-high purity (UHP) Argon. In an embodiment, the system is a model LC-150 from LC Technology (Salisbury, MA). The glovebox 802 has several available ports for vacuum rated feedthroughs that can be used to integrate laser heating capability (optical train can be accommodated outside glovebox) and pyrometer into the setup. Furthermore, the available space in the glovebox 802 can enable accommodation of a position-controlled stand which holds the sample holder at a prescribe distance required for measurements and sample heating using a laser or alternative sample heating method. Despite the ability for the glovebox 802 to maintain relative low oxygen levels, gettering materials (including iron or copper wool) can be used during heating to attract and consume residual oxygen from the glovebox chamber thus preventing specimen oxidation during heating.

A sample holder 804 enables powder and solid samples to be contained for heating with the laser 806 during experimentation. The sample holder 804 can be configured to insulate the sample thermally during irradiation with the laser 806 for dynamic measurement (similar to PBF processing) or in steady state thermal conditions for emission measurements with the multi-wavelength pyrometer. Currently, a sample holder 804 using resistance heating has been developed which has been used to measure normal spectral emissivity while heating samples up to 800° C. Those skilled in the art can recognize that advancements in the holder design can be implemented to increase its temperature capability (full melting of selected powder materials), while also providing tilting capabilities enabling capture of normal and angular spectral emissivity values.

Laser heating can be implemented using two laser sources 808. For example, the lasers might comprise, e.g., an IPG Photonics (~1070 nm) laser rated at 1 kW, and a blue (~450 nm) Nuburu AO 650 laser rated at 650 W. The embodiments include any laser wavelength that may provide improved characteristics (such as increased laser absorptivity of the material at a particular wavelength). Laser heating is used in several processes including surface treatments and welding. A method described to heat and melt solid mild-steel targets using an Nd-YAG (1064 nm) laser was described by Ahn et. al. Their measurements using a single-color pyrometer indicated temperatures approximating 1600° C. for a power of 550 W, with 0.27 mm/s velocity and 2 mm spot size for spot size. The work by Joshi et. al. reported a model to attain temperatures approximating 1500K during heating with a 1064 nm laser with a spot size of 0.6 mm and scanning speeds in the 220-360 mm/s range.

Figure 9:
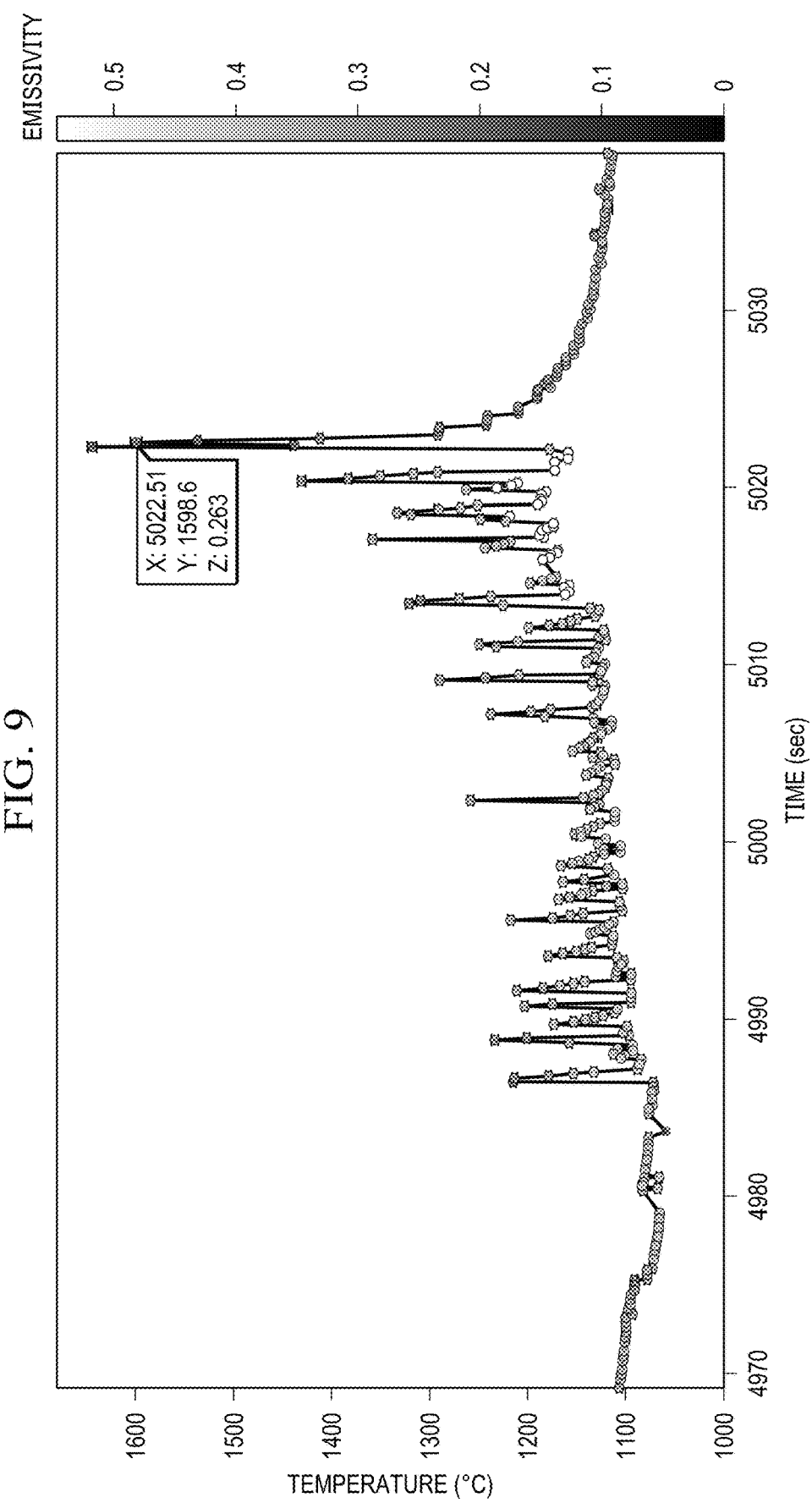
FIG. 9 depicts a graph illustrating improvements in pyrometer acquisition rate in accordance with the illustrative embodiments.

FIG. 9 depicts a graph illustrating improvements in pyrometer acquisition rate in accordance with the illustrative embodiments. The illustrative embodiments result in improvement of the software and hardware of the pyrometer to achieve an increase in acquisition rate. The current off the shelf algorithm and hardware are dedicated to more steady state processes (slower dynamic processing rates), trusting in a steady temperature across the exposure time. However, the PBF process has inherent heating and cooling rates in the order of $10^6$ K/sec, which makes the process hard to measure with current technology. The illustrative embodiments increase the acquisition rate by modifying the hardware and the software algorithms to specifically implement the pyrometer in additive manufacturing processes.

In some illustrative embodiments, the optics are designed to ensure melting temperatures are attained with the static (i.e. single spot, not traversing) source. Also, the setup of some illustrative embodiments uses resistance heaters to assist the sample heating process. Sample heating can be carried out using each laser, individually, or in conjunction with each other, and using resistance heating to elevate temperatures up to the fusion point for the samples studied. Heating with the 1070 nm laser is directly relevant to conditions experienced in commercial LPBF technology. The blue laser provides an innovative heating method given its increased absorption (up to 8 times for some materials compared to 1070 nm lasers), and it should also minimize emission noise given the difference in operating wavelength (~450 nm) compared to the preferred multi-wavelength pyrometer (~900-1650 nm).

The illustrative embodiments can use a preferred multi-spectral sensor (e.g., FMPI Spectra-pyrometer, FMP2, FMP2x, FMP2/2X) produced by FAR Associates (Macedonia, OH), which can measure temperatures in the range from 300-2000° C. and operating in the spectral range from 900-1650 nm, taking measurements with a spectral step of ~2 nm. This device uses Planck's equation for ratio pyrometry to calculate a matrix of temperatures, using the ~2 nm spectral step, from which consensus is obtained to extract the correct target temperature. During operation, the pyrometer can determine the behavior (i.e. gray or non-gray) of the target and adjust its calculation algorithm accordingly. Furthermore, the multi-wavelength pyrometer has a self-adjusting acquisition rate, based on the raw intensity measurements being observed, and can range anywhere from 60 milliseconds to 8 milliseconds. The current detector in the preferred embodiment has a minimum possible data acquisition time of 10 micro-seconds and possibly as low as 4 micro-seconds. The raw intensity data obtained by the multi-wavelength pyrometer can be used in the calculation of the spectral emissivity for targets. A device in accordance with an illustrative embodiment enabled the characterization of the spectral emissivity during heating of a copper powder bed (see FIGS. 16A-16I).

Traditional approaches for measurement of emissive properties of materials involve either a) methods that compare the spectral emission from a target versus that of a blackbody (Planck's law) under the same experimental conditions, or b) the use of methods such as Fourier transform infrared (FTIR) to measure the reflectivity from which emissivity can be calculated using Kirchhoff's' law. The use of the multi-wavelength pyrometer falls in the first category as it employs the calibration and comparison of measurements against the emission of a blackbody. The multi-wavelength pyrometer can be calibrated using a NIST traceable IR-563 blackbody source (Infrared Systems Development Inc., USA). The calibrations can be performed by inserting the blackbody source inside the glovebox environment to ensure experimental measurements are carried out in the same inert gas atmosphere provided by the glovebox. Methods requiring FTIR usually involve complex setups that are not very practical for in situ measurement of emissivity for powder materials used in AM. The illustrative embodiments using the multi-spectral (multi-wavelength) pyrometer provide the versatility for performing characterization of the metal powders in static and dynamic thermal environments relevant and similar to those experienced in PBF, thus directly and positively impacting efforts to qualify and certify AM materials and parts.

Laser safety glass can be employed to cover all windows of the glovebox to prevent specular reflection of the laser. The laser safe windows have a wide spectrum to ensure operability with a wide range of laser wavelengths. All the components can be integrated, including interchangeable optical assemblies (filters, mirrors, focusing lenses, etc.), following analysis using optic assembly design software. The configuration of the setup can enable coaxial or on-axis measurements to be made (see FIG. 6). Fixtures for the lasers can be manufactured to affix the components for the laser including power supplies, safety (kill) switches, etc.

Figure 10A:
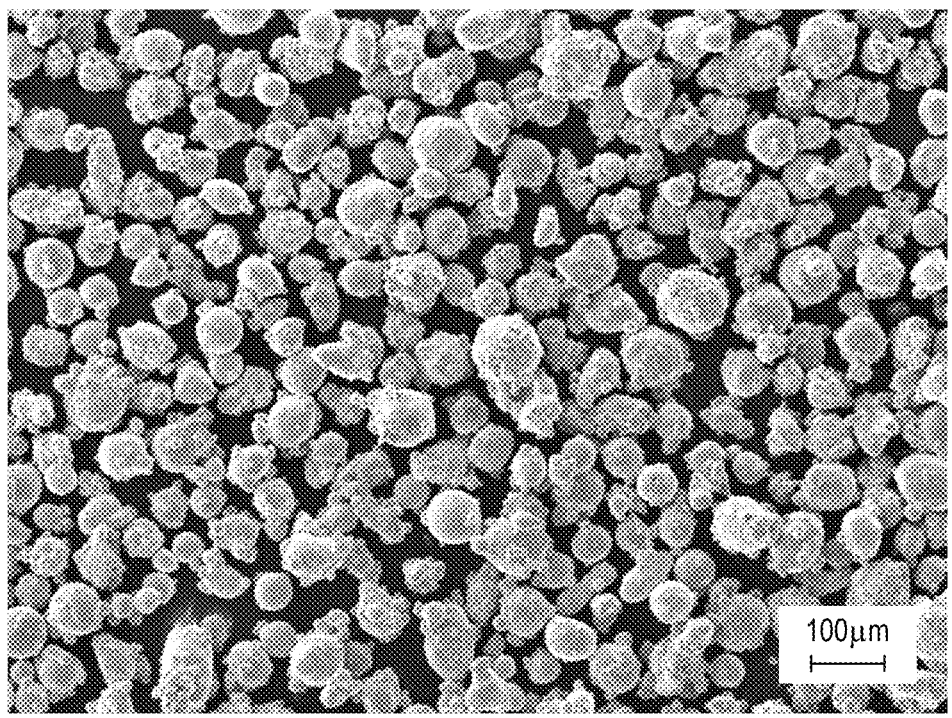
FIG. 10A depicts a scanning electron microscopy image of metal powder used to form a powder bed at 100× magnification in accordance with an illustrative embodiment.
Figure 10B:
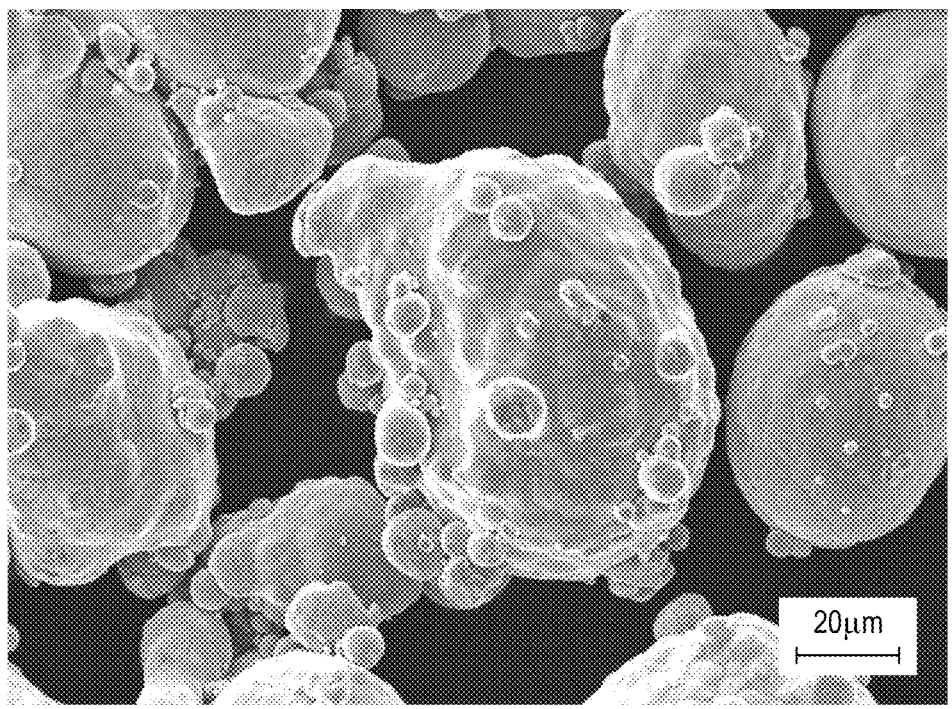
FIG. 10B depicts a scanning electron microscopy image of metal powder used to form a powder bed at 700× magnification in accordance with an illustrative embodiment.

FIGS. 10A and 10B exemplify a powder, morphology, and size, as variables to be studied in relation to emissivity. This powder is representative of the size and morphology of those used in PBF and is only used for illustration. Although the preferred morphology of powders used in PBF is spherical, the embodiments described here can be applied to other powder morphologies and sizes with similar embodiments. Additionally, preferred materials include those metal alloys and pure metals commonly used in PBF along with other materials such as ceramics and composites that can be processed similarly and with temperatures in the range of the embodiments. For the embodiments highlighted in FIGS. 10A and 10B, the material used was high conductivity copper (HCCU) powder obtained from Sandvik (Sandvik Osprey Ltd., UK) with a particle size range of 45-100 μm (d50~75 μm) as per the powder specification from the provider. Two copper powder lots were mixed to produce the 10 kg batch that was employed in the experiment. The mixture consisted of equal parts (5 kg) of powder lots 16D0323 and 16D0338. The mixing procedure was performed in a Turbula T10B (WAB Group, Switzerland) for 1 hour. FIGS. 10A and 10B show 100× and 700× magnifications, respectively, of the mixed powders observed by electron microscopy in a JEOL IT500LV (Tokyo, Japan) microscope.

To obtain the thermal signatures during the preheating of the powder bed, the preferred FMPI Spectropyrometer (FAR associates, OH, USA) was utilized. The sensor for the FMPI MW pyrometer operates in the spectral range of ~900-1700 nm with a resolution of ~1.56 nm. Nonetheless, the device can be calibrated in the range of wavelengths from 1080-1650 nm unto which temperature calculation algorithms operate. The usable range of wavelengths can be further adapted depending on application through advancement of hardware and software technology. The device uses an Indium-Gallium-Arsenide (InGaAs) photodetector that collects the entire spectrum simultaneously to avoid temporal bias. The raw spectral data was calibrated using a National Institute of Standards and Technology (NIST) traceable blackbody source (IR-563, Infrared Systems Development Corporation, FL, USA). Such calibration converts the uncalibrated detector output (raw intensity) to an actual spectral radiance measurement (corrected intensity). This corrected intensity over the spectrum is then used to calculate temperature based on Planck's distribution law. The instrument has an accuracy of ±0.15% for gray targets when measuring in the range of 500-2000° C. and ±0.25-0.75% for non-gray behaving targets, as specified by the manufacturer.

For the temperature computation, the preferred FMPI (multi-wavelength) pyrometer uses an algorithm that removes anomalies by analyzing the spectrum recorded, and disregards the corrected intensities that do not exhibit thermal (Planckian) behavior. After this decision process is performed, the selected corrected intensity data over the wavelength spectrum is used to calculate a matrix of temperature values by employing the ratio solution of Planck's law for multiple intensity-wavelength pairs. The temperatures in the matrix are averaged and the corresponding standard deviation is analyzed; if the standard deviation is deemed acceptable, the average temperature and its standard deviation are recorded. Otherwise, the algorithm performs a check for non-graybody behavior (i.e. spectral variation of emissivity) and corrects individual temperatures in the temperature matrix to account for this variation. Following the non-gray correction, the temperature matrix is recalculated, and the average temperature and its standard deviation (referred to as tolerance by the manufacturer) along with several other parameters are recorded in a log file (spreadsheet). For every temperature measurement reported, the FMPI pyrometer stores a data file with raw and processed information consisting of raw intensity, noise, corrected intensity, and emissivity values at each wavelength used. The emissivity values captured in the stored files were used to construct plots of spectral emissivity (1080 nm-1640 nm) at the various process temperatures.

The preferred FMPI pyrometer includes an interchangeable, compact, optics assembly that allows the user to aim at different targets. Target (spot) size is small (~2.65 mm in one of the current embodiment configurations) and relatively invariant with operating distance. In aiming mode, the pyrometer projects a laser spot on the area to be measured, allowing for easy and accurate measurement location determination. The end optic consists of a lens assembly that focuses radiation onto the core of a fiber optic cable, which is connected to the FMPI pyrometer detector box. The fiber optic allows for easy relocation of the end optic with respect to the detector box. In this work, measurements were taken by locating the FMPI pyrometer optic at 15° from the normal vector of the powder bed (see FIG. 2). This angle has no effect on the measurements as reported by the manufacturer. The observation angle starts to influence the measurements after ~30°.

Stored data files report the emissivity values along the wavelength range of the FMPI pyrometer for every single temperature measurement recorded in the log file. To calculate the spectral emissivity values, the device uses a form of Planck's distribution law (Eq. 1).

$$\varepsilon = \frac{L\lambda^5 [e^{hc/\lambda k_B T} - 1]}{2hc^2} \quad \text{Eq. 1}$$

In this expression, the corrected intensity values measured by the FMPI pyrometer (available in the stored data file) are taken as L and the average temperature calculated as T. The constant values for c, h and $k_B$ are the speed of light in a vacuum ($2.998 \times 10^8$ m/s), Planck's constant ($6.626 \times 10^{-34}$ J-s), and the Boltzmann constant ($1.381 \times 10^{-23}$ J/K), respectively. The wavelength values ($\lambda$) and spectral emissivity are recorded from 1080-1640 nm in steps of 1.56 nm. Changes for the speed of light under vacuum versus air have been ignored and their impact on the emissivity calculation can be considered negligible given the speed of light in vacuum and in air varies by only ~0.03%. Data from the raw files were manipulated and processed using custom scripts developed in MATLAB® 2019b (MathWorks, MA, USA) to plot the spectral emissivity values at different temperatures.

The preferred FMPI pyrometer has a self-adjusting exposure time based on the raw intensity which directly impacts the data acquisition rate (repetition or log rate). The pyrometer calculates and reports a single temperature measurement once an adequate signal is achieved with an acceptable signal-to-noise ratio. The higher the target temperature the faster the data acquisition rate. The manufacturer reports a minimum exposure time of 0ps with a maximum acquisition rate of 40 ms. For this experiment, the exposure times varied in the range from 18 milliseconds up to 8 seconds, while the temperature acquisition rate was computed from the data to be in the range of 0.125-23 Hz. Although there are methods known in the art for improving the acquisition rate of the MW pyrometer described here, the current acquisition rate is similar (or better as will be shown for the experimental arrangement described here) to most thermocouples, such as the ones used in this study, that have response times ranging from approximately 3 ms to 2.1 s, depending on the sheathing thickness. Improvements in acquisition rate will be incorporated in the current embodiments without loss of the inventive approaches described here. Obviously, the significant added benefit of non-contact measurement provided by the MW pyrometer enables its use in the extreme temperature environment such as the PBF systems (EB and laser) included in the current embodiments.

Although the preferred FMPI pyrometer is practical for use in PBF AM, the acquisition rate obtained in this study is still comparatively low compared to other MW sensors. For example, Dagel et al. created a multi-wavelength pyrometer using four sCMOS cameras with different bandpass filters to perform ratio pyrometry for temperature measurements on laser welding and laser-based AM. The acquisition rate reported for the detector was as high as 60 Hz in the wavelength range from 400-1000 nm. Similarly, Doubenskaia et al. reported the development and use of a multi-wavelength pyrometer with 12 channels for temperature measurement in laser cladding applications. This detector was reported to have a minimum exposure time of 50 µs with a spectral range of 1.0-1.5 µm. Other published works from the same group reported measurement of temperatures in L-PBF, yet their work did not provide a discussion of the acquisition rate of the device. The optical assembly featured in these studies is for measurements on the axis of the laser, attached directly to the scanner of the L-PBF machine. However, it should be noted that these faster MW devices use many less channels than the instrument used in the illustrative embodiments. Dividing the incident light into more channels leaves less intensity per channel and hence longer data acquisition times. Work by Smurov et al. deals mostly with directed energy deposition (DED) through the use of a multi-sensor approach with monochromatic, 2D monochromatic, and multi-wavelength pyrometers. The MW pyrometer used is in a range from 1.001-1.573 µm with a sampling rate of 50 us, but it only has 12 channels or wavelengths. The "restoration" of true temperatures in DED and laser welding is demonstrated but not for SLM. Some of the characteristics of the MW pyrometer are better than those of the FMPI, such as a smaller spatial resolution of 800 um versus the 2.67 mm of the FMPI. Work by Chivel et al. creates two color pyrometry by using two CCD cameras operating in two discrete wavelengths of 0.7 um and 0.9 um. Additional work by Chivel et al. dealt with the use of a two-color pyrometer used for calculation of brightness or color temperatures. In contrast, the illustrative embodiments extract the actual, calibrated temperature with the FMPI and FMP2 potentially, while also capturing the emissivity values. Something they do not report on.

Multi-wavelength pyrometry has also been used extensively to perform temperature measurements on other complicated environments where direct contact measurements were not possible. For example, Montgomery et al. reported the development of a seven channel multi-wavelength pyrometer that was used in measuring fast temperature changes and to obtain phase transformation data for various materials, such as palladium hydride (PdH), heated up by lasers inside diamond anvil cells. The detector used Indium-gallium-arsenide (InGaAs) and pure gallium (Ga) sensors operating in the wavelength range from 800-2200 nm with a reported acquisition rate in the range of 1-70 kHz, which the authors state was limited by their analog-to-digital converter. The study by Wang et al. reported the use of an 8 channel multi-wavelength pyrometer with silicon (Si) and InGaAs sensors. The pyrometer was capable of reading temperatures from 1500 K up to 15,000 K in a wavelength range from 500-1650 nm. The acquisition rate of the pyrometer was equivalent to that of the individual sensors (either Si or InGaAs) employed, corresponding to 50 MHz or 150 MHz, respectively.

In comparison to most of the multi-wavelength detectors employed in the research described above, the preferred FMPI pyrometer can be considered a practical approach for monitoring in PBF (EB and laser). First, the end optic of the FMPI pyrometer can be easily integrated into current generation EB-PBF and L-PBF systems to carry out measurements. Also, the FMPI pyrometer can be calibrated against the blackbody source offline and readily used afterwards. The alternative approaches described above involve more complex component assemblies, such as the need for inline blackbodies that make integration within an EB-PBF machine more challenging. The most prominent advantage of the FMPI pyrometer is its ability to capture emission over a wide spectrum (1080-1640 nm) using intervals of 1.56 nm that results in a high spectrum resolution defined with 359 channels (pairs of intensity-wavelength). The FMPI's high wavelength resolution enables it to correct for non-graybody behavior and analyze the data captured to discern spectral domains where plasma emissions, or environmental absorptions are present, adjusting its calculation process to obtain accurate temperatures. By comparison, other detectors described in literature only acquire data from a limited number of wavelength channels, anywhere from 4 to 12, that could miss these spectral domains and can reduce accuracy of the temperatures calculated. Furthermore, the illustrative embodiments may employ a separate scanner for L-PBF that is synchronized with the laser scanner and optimized for the MW pyrometer so that it can be calibrated and maintain accurate measurements during its dynamic movements.

As indicated previously, EB-PBF involves processing at or lower than $10^{-3}$ mBar vacuum levels and elevated temperatures. This makes it challenging for directly attaching sensors inside the processing chamber because most sensors' electronics cannot withstand these extreme temperature and vacuum conditions. For this reason, the FMPI pyrometer was attached outside the machine looking into the chamber through an available viewport. The inventive setup was improved from that previously described in the works of Minjares and Cordero et al. While Minjares used this external setup to measure temperatures during processing of a Ni-based alloy in an Arcam S12 EB-PBF system, Cordero et al., measured temperatures for Ti6Al4V while processing in the same A2 system used in our work. In both prior studies, the setup resulted in metallization of the quartz glass in the viewport, reducing and eventually stopping the acquisition of signals by the pyrometer. The detrimental impact on acquisition of data was evident as soon as a couple layers were processed, as reported by. With the use of radiation thermometers, as is the case with the FMPI pyrometer, the reduction of the transmission due to metallization will cause the loss of calibration, thus negatively impacting the accuracy of measurements.

In the current work, the experimental setup included the development and installation of a vacuum rated extension tube that prevented metallization of the quartz and thus enabled near-continuous measurements without loss of calibration for the FMPI pyrometer. The extended tube provided sacrificial area where metal vapor condensed before reaching the quartz glass. An available viewport, situated atop the chamber of the Arcam A2 system (see FIG. 2), was fitted with a custom-built stainless-steel fixture unto which an assembly was attached that consisted of two sections of high-vacuum rated KF-40 flanged tube. The tubes had nominal lengths of 320 mm and 130 mm to account for the focal distance of the FMPI pyrometer end optic, and they were coupled using available vacuum clamps. Once the KF-40 tubes were attached to the stainless-steel fixture, the total distance of this extension assembly was 450 mm (with an L/D of 11.25). The quartz glass was a 6 mm thick GE 124 window (QSI Quartz scientific, OH, USA), and it was attached to the KF-40 flanged fitting using Torr seal (Agilent Technologies, Inc., CA, USA), which is a vacuum rated cement. Quartz was used as it provides a steady transmission of ~94% over the wavelength range of the FMPI Spectro-pyrometer. The 6% loss in transmission was accounted for with the calibration of the FMPI pyrometer against the blackbody source, including the quartz glass used for the experiments. Once the assembly containing the fixture and extension tube was installed, the end optic of the FMPI pyrometer was located concentric to the tube, with a gap of 5 mm from the quartz glass. The end optic (S/N: 13249-1) consisted of an optical assembly with a focal length of 762 mm, as specified by the manufacturer (FAR associates, OH, USA). Different length-to-diameter ratios can be used as long as metallization does not occur during operation. The exact ratio for a specific setup can be determined experimentally by calibrating (using the quartz window) before and after use in the EB-PBF machine.

For the experiment reported here, the FMPI pyrometer was aimed at a single, distinct spot or small region within the powder bed. The setup was prepared by starting with the formation of a flat powder bed in which initially the tip of the thermocouple was exposed and approximately level with the surface of the powder. Then, using the tip of the thermocouple and the green laser spot projected by the FMPI optic as visual indicators, the measuring spot of the pyrometer was located at ~20 mm from the thermocouple tip (see FIG. 3). Once both the thermocouple and pyrometer were aligned relative to each other, the powder bed was lowered 100 μm and a fresh layer of powder raked across. This method ensured that the thermocouple tip was embedded ~100 μm below the powder bed throughout the experiment, and thus able to provide temperature readings sufficiently close to the exposed surface of the powder bed. Correspondingly, the pyrometer was observing directly on the top surface of the powder bed at an angle of 15° from the surface normal. The offset introduced between the location of the thermocouple tip and the measuring spot for the FMPI pyrometer was intentional and used to minimize heat conduction through the body of the thermocouple that would impact the temperature readings for the pyrometer's region of interest.

To maintain the accuracy specified by the manufacturer, a calibration using a National Institute for Standards and Testing (NIST) traceable blackbody source (IR-563, Infrared Systems Development Corporation, FL, USA) was performed. The first step of the calibration process consists of calibrating the FMPI while recording the blackbody source at the steady state temperature of 1000° C. Then, the calibration is verified by lowering the temperature of the blackbody source to 500° C. and confirming the values captured at this steady temperature. Afterwards, a final verification step was performed at five more temperatures, starting at 600° C., followed by increments of 100° C., up to 1000° C. The calibration and verification processes were performed before carrying out the powder bed preheating experiment reported here, using the same optical path (GE 124 quartz glass) as that used during experiments to remove signal transmission losses due to the optical path. However, the calibration was performed in open environment conditions (30% relative humidity), different from the vacuum environment where the experiments were performed. The impact that this may have on temperature and emissivity calculations was assumed to be negligible due to the ability of the FMPI pyrometer to remove sections of the spectrum that do not emit following Planckian behavior. Although the effects of humidity are directly removed by the temperature calculation algorithm employed by the FMPI, these can also be removed from the captured Planckian curve by calibration inside an Argon purged environment such as that provided by the glovebox environment, as depicted in the embodiment shown in FIG. 8.

As can be seen in Table 1, the largest standard deviation reported by the device during the blackbody calibration assessment was ±1.28° C. for temperatures in the range from 500° C. to 600° C. Also, the general trend observed during this calibration verification process indicated that standard deviation decreased as the temperature of the blackbody increased except for the highest temperature of 1000° C. The smallest tolerance was ±0.30° C. at a temperature of 900° C. The table also shows the measured emissivity for the blackbody source at the wavelength of 1500 nm, reported to three decimal places, with values that remained within the expected emissivity of 1.000.

TABLE 1

Values obtained during calibration and verification of the FMPI pyrometer against a blackbody source.

| | Before experiment | |
|---|---|---|
| Blackbody Temperature Setting | Pyrometer reading (Temperature) | Pyrometer reading (Emissivity) |
| 500° C. | 501.9 ± 1.28° C. | 1.000 |
| 600° C. | 602.8 ± 1.28° C. | 1.000 |
| 700° C. | 702.8 ± 0.95° C. | 1.000 |
| 800° C. | 802.5 ± 0.51° C. | 1.001 |
| 900° C. | 901.7 ± 0.30° C. | 1.002 |
| 1000° C. | 1000.2 ± 1.12° C. | 0.997 |

During the preheating experiment that was conducted, continuous measurements of temperature were recorded by the FMPI pyrometer in steps lasting ten minutes. From each steady state step, three temperatures were sampled and used for the calculations performed in the following for computing the radiation contribution ratio (R). These values were also used for sampling of spectral emissivity calculated by the FMPI pyrometer. The temperatures sampled including the median (the temperature occurring exactly at the five-minute mark in each preheating step), and two more temperatures sampled one minute before and one minute after the median. The mean temperatures reported at each preheating step correspond to average values calculated by selecting temperatures occurring in the range spanning from one second before to one second after the median and hence include a measure of the standard deviation as listed in Table 2.

TABLE 2

FMPI pyrometer temperature measurements used for each powder bed preheating step

| Preheating Step | Temperatures | | | |
|---|---|---|---|---|
| | Median | Mean | Before median | After median |
| 1 | 610.0 ± 1.89° C. | 609.9 ± 0.8° C. | 611.1 ± 1.91° C. | 610.0 ± 1.87° C. |
| 2 | 731.4 ± 1.11° C. | 737.0 ± 4.2° C. | 731.7 ± 1.10° C. | 730.9 ± 1.12° C. |
| 3 | 786.9 ± 1.23° C. | 785.7 ± 5.1° C. | 796.0 ± 1.04° C. | 784.4 ± 1.22° C. |
| 4 | 827.5 ± 1.78° C. | 827.8 ± 5.3° C. | 834.8 ± 1.70° C. | 821.4 ± 1.71° C. |
| 5 | 834.4 ± 1.45° C. | 831.5 ± 5.8° C. | 839.9 ± 1.40° C. | 825.9 ± 1.48° C. |
| 6 | 842.4 ± 0.96° C. | 841.1 ± 6.1° C. | 835.3 ± 1.01° C. | 835.9 ± 0.97° C. |
| 7 | 875.3 ± 0.55° C. | 875.5 ± 7.2° C. | 871.8 ± 0.64° C. | 883.1 ± 0.44° C. |
| 8 | 918.1 ± 0.32° C. | 910.8 ± 8.9° C. | 911.1 ± 1.35° C. | 905.6 ± 1.82° C. |
| 9 | 949.7 ± 0.90° C. | 941.2 ± 7.9° C. | 954.0 ± 2.35° C. | 953.1 ± 0.38° C. |

Figure 2B:
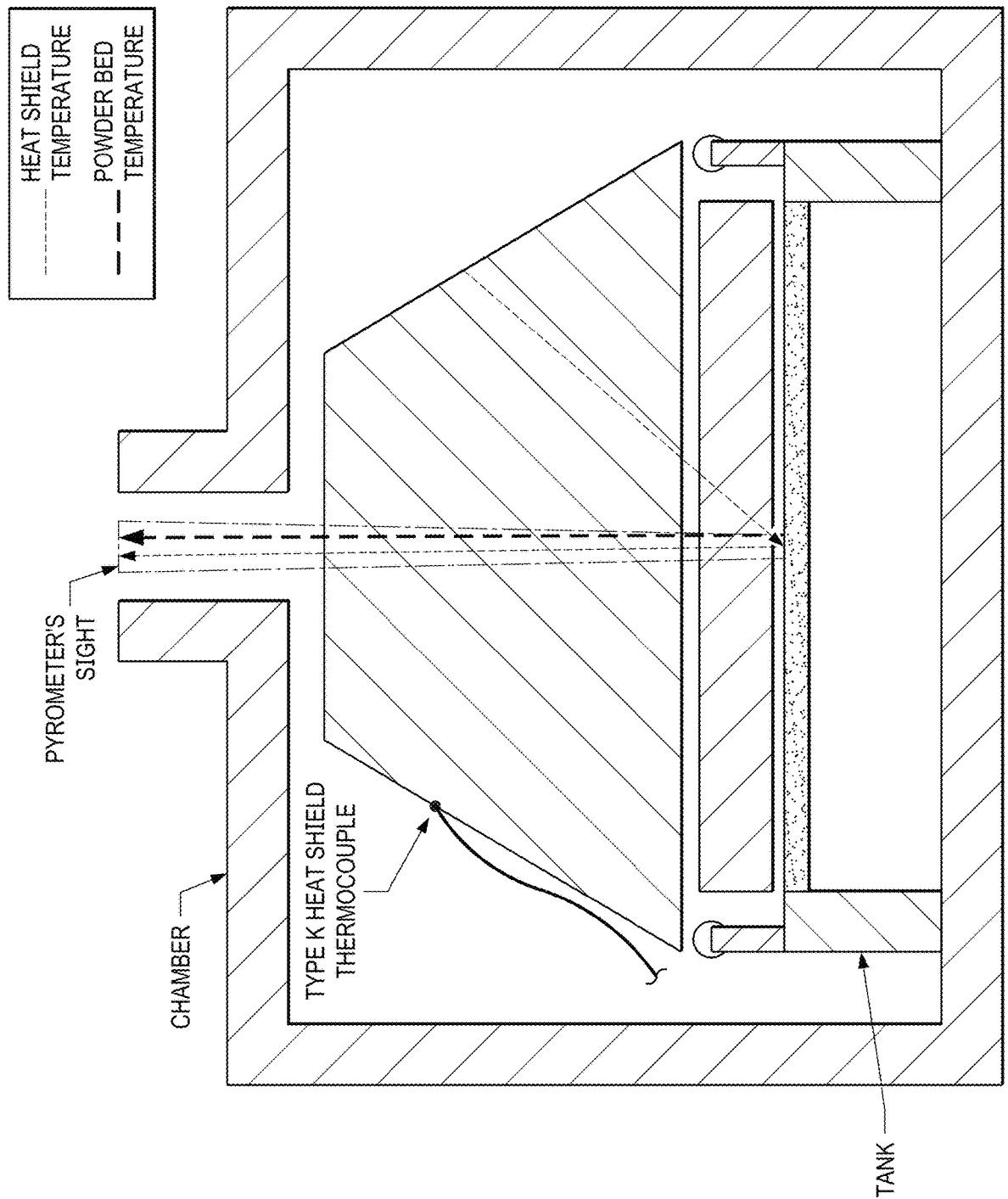
FIG. 2B illustrates how radiation emission from a heat shield inside the chamber impacts the powder bed to reach the pyrometer in accordance with an illustrative embodiment.

Temperature measurements using non-contact methods usually involve an analysis of the radiative surrounding environment to account for its effect on the temperature measurements. To evaluate the radiative environment on the measurements, the temperatures for two walls of the heat shield assembly of the Arcam A2 system were continuously measured during the length of the preheating experiment. Following the method presented by Rodriguez et al. and Mireles et al., the temperatures of the heat shield walls were measured by attaching spot welded tip GG-K-24 type-K thermocouples (Omega Engineering, CT, USA) to the front and side heat shield walls at the center location of the heatshield, as depicted by FIG. 2B. The attached thermocouples were inserted into the vacuum chamber using an ISO-KF NW 16 120XTK016-5-S type-K thermocouple feedthrough (Pfeiffer Vacuum Inc., Boston, MA). The measurements from these thermocouples were recorded using an NI-9214 temperature input module with a cDAQ-9171 chassis (National Instruments, TX, USA).

For this analysis, the assumption was made that the temperature captured by the thermocouple attached to the side heat shield wall could be used as an approximation of the mean radiant temperature of the heat shield enclosure. Following the work by Rodriguez et al., a mean radiant temperature 27° C. lower than the side heat shield is reported. In this work, the highest shield temperature measured was ~355° C. which was similar to the ~368° C. value reported by Rodriguez et al. FIG. 2B depicts how the radiation emission from the heat shield impacts the powder bed (absorbed by and reflected from the surface) to reach the pyrometer. As temperature was elevated due to the increased preheating, the heat shield temperature also increased, with parts of these reflected emissions absorbed by the powder bed and reflected into the FMPI end optic by the powder bed itself.

The contribution of the EB-PBF radiative environment (brushed stainless-steel heat shield walls) on the pyrometer measurements was approximated using Planck's Law to calculate a ratio of the spectral radiance of the heat shield ($B_{HS}$) to that of the powder bed ($B_{PB}$) using the expression below. This assumes blackbody (i.e. maximum possible) emission from the heat shield walls and from the powder bed into the pyrometer:

$$R\ \% = \frac{B_{HS}}{B_{PB}} = \frac{\frac{2hc^2}{\lambda^5} \ast \frac{1}{e^{\left[\frac{hc}{\lambda k_B T_{HS}}\right]} - 1}}{\frac{2hc^2}{\lambda^5} \ast \frac{1}{e^{\left[\frac{hc}{\lambda k_B T_{PB}}\right]} - 1}} \ast 100 \qquad \text{Eq. 2}$$

Where h is Planck's constant, $k_B$ is Boltzmann constant, c is the speed of light, λ is the wavelength-all of them with units in the SI system—and the temperatures in Kelvin for the heat shield ($T_{HS}$) and for the powder bed ($T_{PB}$). With this equation, the ratio of contribution was calculated at each preheating step by using the steady median temperature of the powder bed captured by the pyrometer and the corresponding temperature of the heat shield wall. The analysis was performed in the calibrated spectral range of the FMPI pyrometer (i.e. ~1080-1640 nm).

The ratio calculation was made assuming perfect reflection, and emission from a blackbody (i.e. emissivity ε=1) and then by imposing emissivity values for brushed stainless steel with an ε=0.36, the emissivity of copper obtained in situ, and reflectivity values from the copper (r=1-ε). However, it should be pointed out that, for this experimental setup, these ratio values will decrease even further if the emissivity and reflectivity from the copper powder bed, plus the radiation view factors from the heat shield enclosure to the powder bed, and from the powder bed to the pyrometer end optic piece, are all taken into account.

The logged values from the FMPI pyrometer, the thermocouple in the powder bed, and from the thermocouples attached to the heat shield walls provided a time stamp that could be used for tracking and correlating the measurements amongst instruments. Before experimentation, the time-stamps of all the devices used were manually synchronized to the computer logging the data from the FMPI pyrometer.

FIG. 11A shows a plot of the temperature values recorded by the FMPI pyrometer (black), the thermocouple underneath the powder bed surface (gray), and for the thermocouple attached to the heat shield (light gray) throughout the length of the preheating experiment.

Nine steps are clearly visible in the temperature plot corresponding with each preheating step. This plot indicates that the FMPI pyrometer captured higher temperature values compared to the thermocouple; this effect can be explained by the fact that the thermocouple was measuring ~100 μm below the surface of the powder bed whereas the pyrometer was measuring directly on the exposed surface of the bed.

Using a simple 1-D steady-state conduction model, it was determined that 100 μm of powder (with an assumed thermal conductivity of 0.232 W/m-K, as described by for 75 μm diameter Cu powder) would decrease the readings from the thermocouple by 28-63° C., depending on the temperature of the surface (i.e. the preheating step). Nevertheless, similar overall behavior was shown by both devices, as shown in FIG. 11A.

Figure 11B:
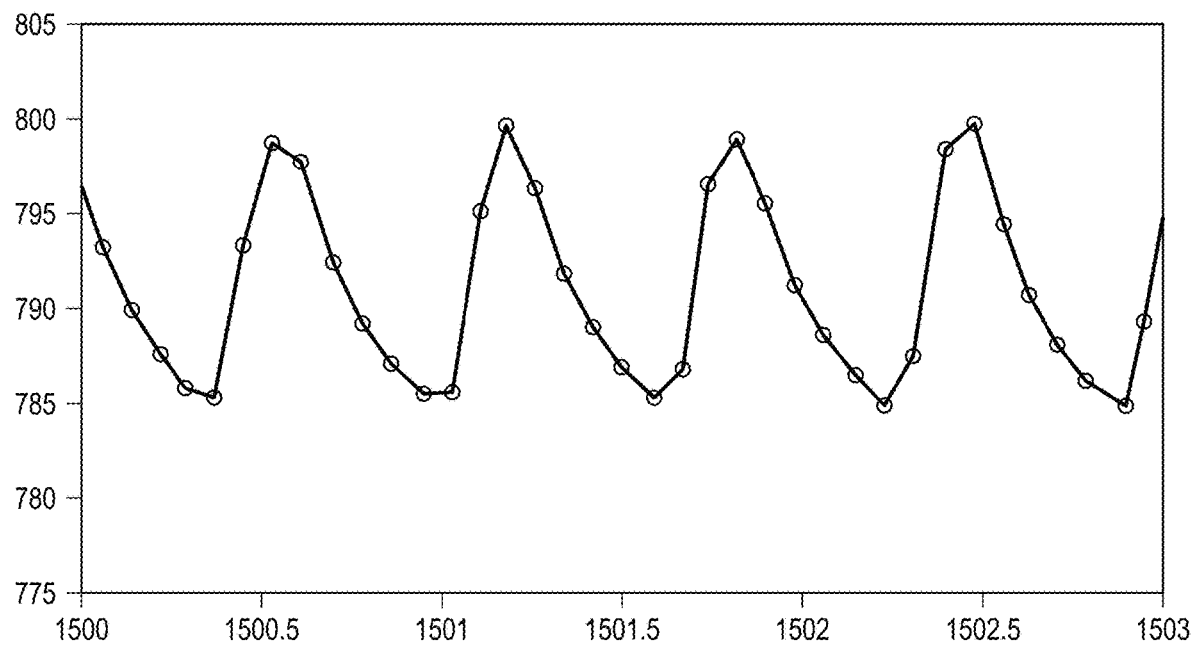
FIG. 11B depicts a zoomed in view of the graph depicted in FIG. 11A during the third sustained preheating step in accordance with an illustrative embodiment.
Figure 11C:
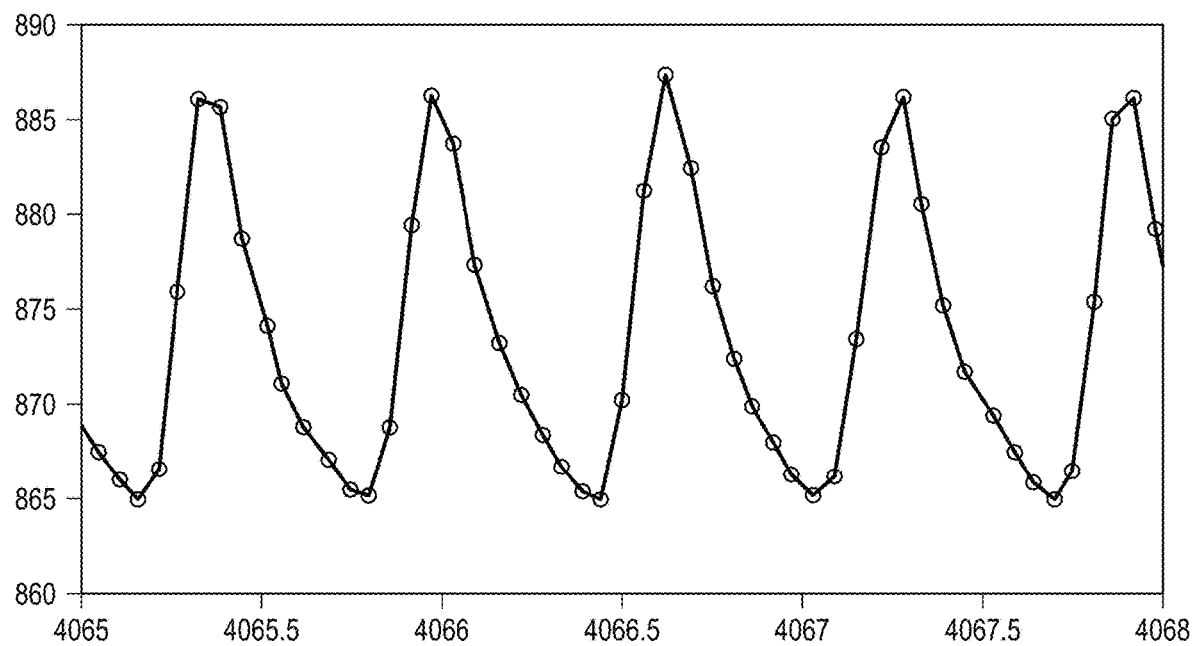
FIG. 11C depicts a zoomed in view of the graph depicted in FIG. 11A during a sustained preheating step (the seventh preheating step) in accordance with an illustrative embodiment.

The regions indicated with small boxes and arrows in FIG. 11A correspond to amplified sections of the third (FIG. 11B) and seventh (FIG. 11C) sustained preheat steps demonstrating a fluctuation behavior in temperature that is evident for these and every sustained preheating step. Sustained preheating comprises maintaining the preheating level (temperature) throughout the scanning strategy. The origin of this fluctuating behavior of the measurements was related to the scanning strategy of the electron beam which can be thought of as subsequent fronts advancing through the powder bed. For this, an analysis was conducted to examine if the period in the temperature plots matched the time it took the preheat front generated by the electron beam to cycle and pass over the measurement region of the FMPI pyrometer. The total time it takes for the electron beam to scan the preheat area was calculated using the scanning parameters described previously and it resulted in a time of 0.6 s. This time corresponds to the period measured from the pyrometer signal peaks shown in both FIGS. 11B and 11C which was 0.61±0.06 seconds; considering a total of 17 measurements over 10 seconds elapsed at 3500 seconds of the experiment.

Towards the end of the plot in FIG. 11A, there are seven melting events depicted as seven consecutive peaks. The machine executed seven consecutive melt steps in which no powder was spread during the raking time in between scans. The region scanned is shown in an expanded view in FIGS. 12A and 12B.

Figure 12A:
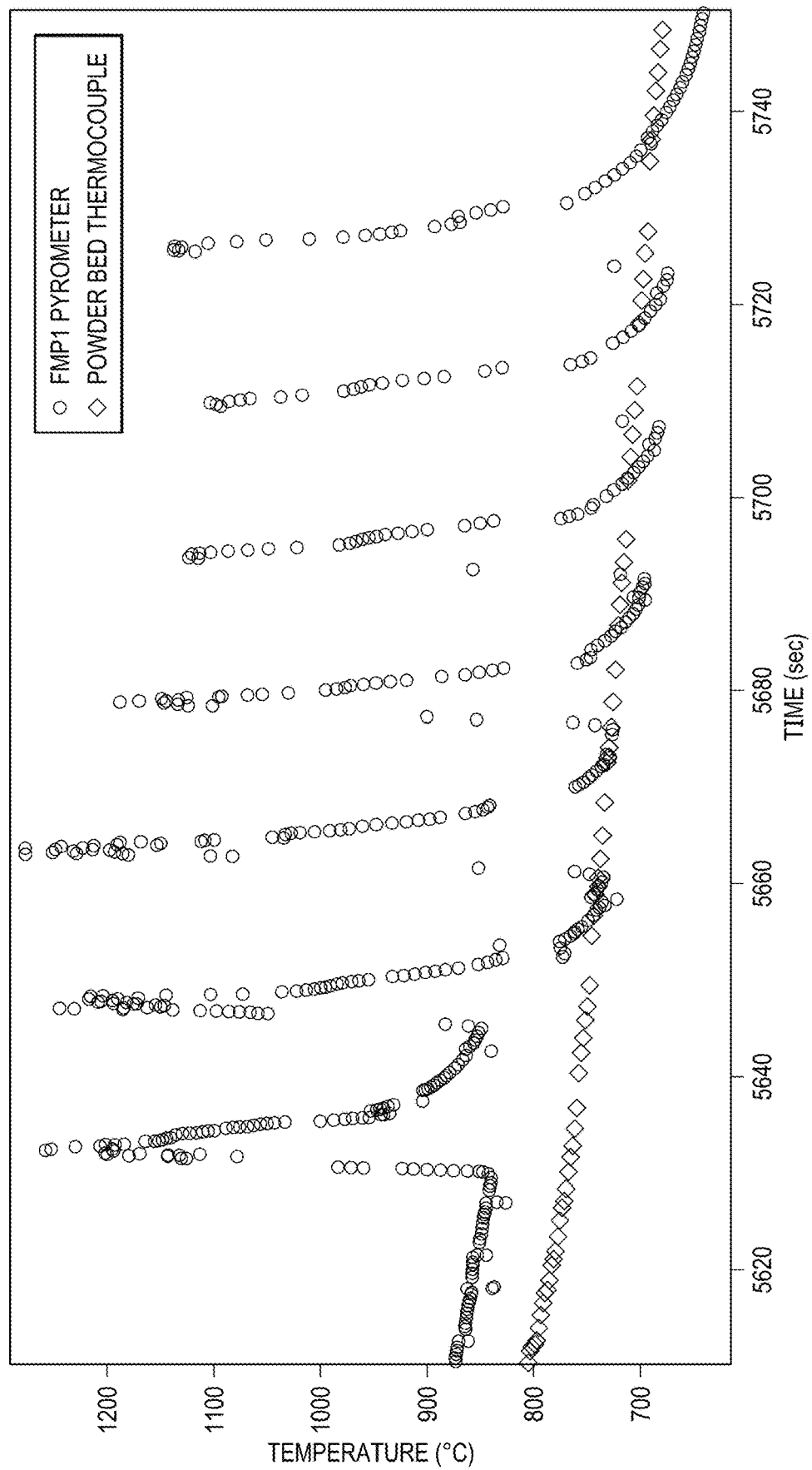
FIG. 12A depicts a graph of temperature signals captured by the multi-wavelength pyrometer during seven consecutive melting steps performed without the normal process of powder deposition and preheating employed in EB-PBF in accordance with an illustrative embodiment.
Figure 12B:
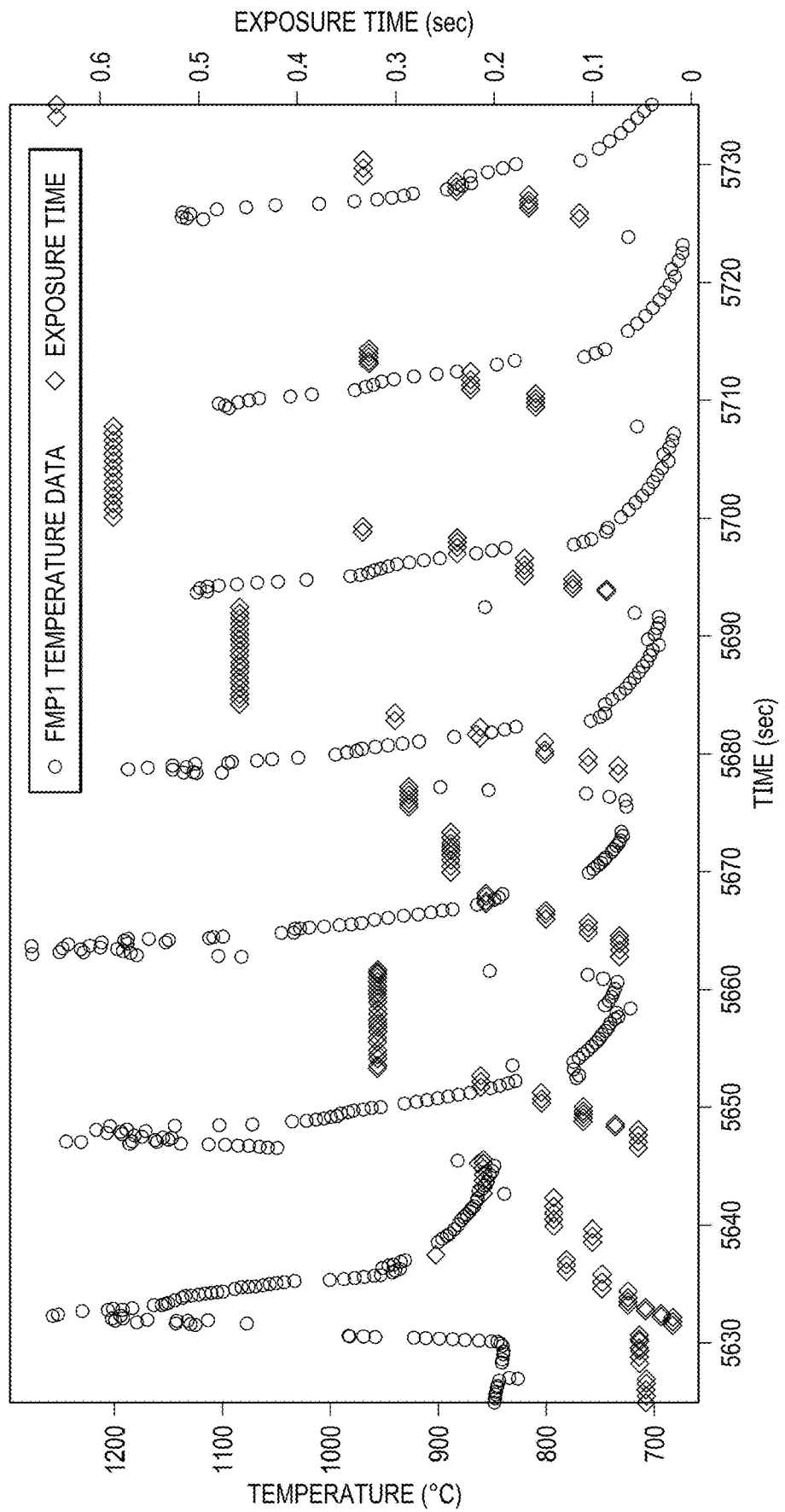
FIG. 12B depicts a graph of temperature signals along with exposure times captured by the multi-wavelength pyrometer during seven consecutive melting steps performed without preheating and powder deposition in accordance with an illustrative embodiment.

The data indicate that the melting point for copper (~1084° C.) was exceeded in every melting event with the maximum and minimum temperatures of individual peaks measured at 1277° C. and 1103° C., respectively. Further, there was an overall decreasing trend observed by the FMPI pyrometer during these melt events, as shown in FIG. 12A. This behavior can be explained given that no powder deposition occurred in between each of these melting steps, and the increasing volume of solidified material after each melt scan resulted in larger lumped-capacitance that effectively increased heat capacity after every subsequent scan, as shown by the decreasing trend in temperature in FIGS. 12A and 12B. However, the peak temperatures measured may be lower than the actual maximum temperatures reached during the melting due to the self-adjusting exposure time. The span in between peaks corresponded with the time involved in the regular raking step (~14 sec), although no powder deposition was performed. Therefore, re-melting events occurred after the first melt event indicated by the first peak.

The experimental setup allowed for measurements of the temperatures of two heat shield walls using type-K thermocouples as depicted in FIGS. 2A and 2B. FIG. 11A includes the plot for the temperature of the side heat shield wall, shown in light gray. This plot shows a steady increase from room temperature up to about ~310° C. (at the 3000 second mark) followed by a second region with a lower temperature slope that reached a maximum temperature of ~354° C. (at ~5500 seconds) before preheating was stopped. At this point in time, the corresponding powder bed temperature captured by the FMPI pyrometer was ~960° C. The temperature values captured for the front heat shield wall remained below those of the side heat shield, as can be seen in FIG. 11A.

The high scanning speeds of the beam (~500-2000 mm/s) in EB-PBF lead to non-equilibrium solidification, requiring the use of thermal radiation sensors with high acquisition rates to capture this transient temperature behavior. Devices with an acquisition rate in the range of MHz or higher are required to measure cooling rates, as these have been reported on the order of $10^5$-$10^6$ K/s. The use of radiation thermometry devices operating in the MHz range could also provide valuable information of the solidification dynamics as the reported values for solidification rates in the L-PBF process are on the range of 0.5-0.75 m/s.

As discussed previously, the FMPI pyrometer has a feature that adjusts the exposure time and causes the dynamic variation of the acquisition rate based on the intensity of the target being observed. This effect can be noticed in FIG. 12A, where exposure times are reported along with the temperatures calculated by the FMPI pyrometer as a function of time. As discussed previously, when the temperature increases (i.e. during melting), the exposure time decreases, as the intensity of the target is increased at higher temperatures. This decrease in exposure time increases the acquisition rate.

Figure 13:
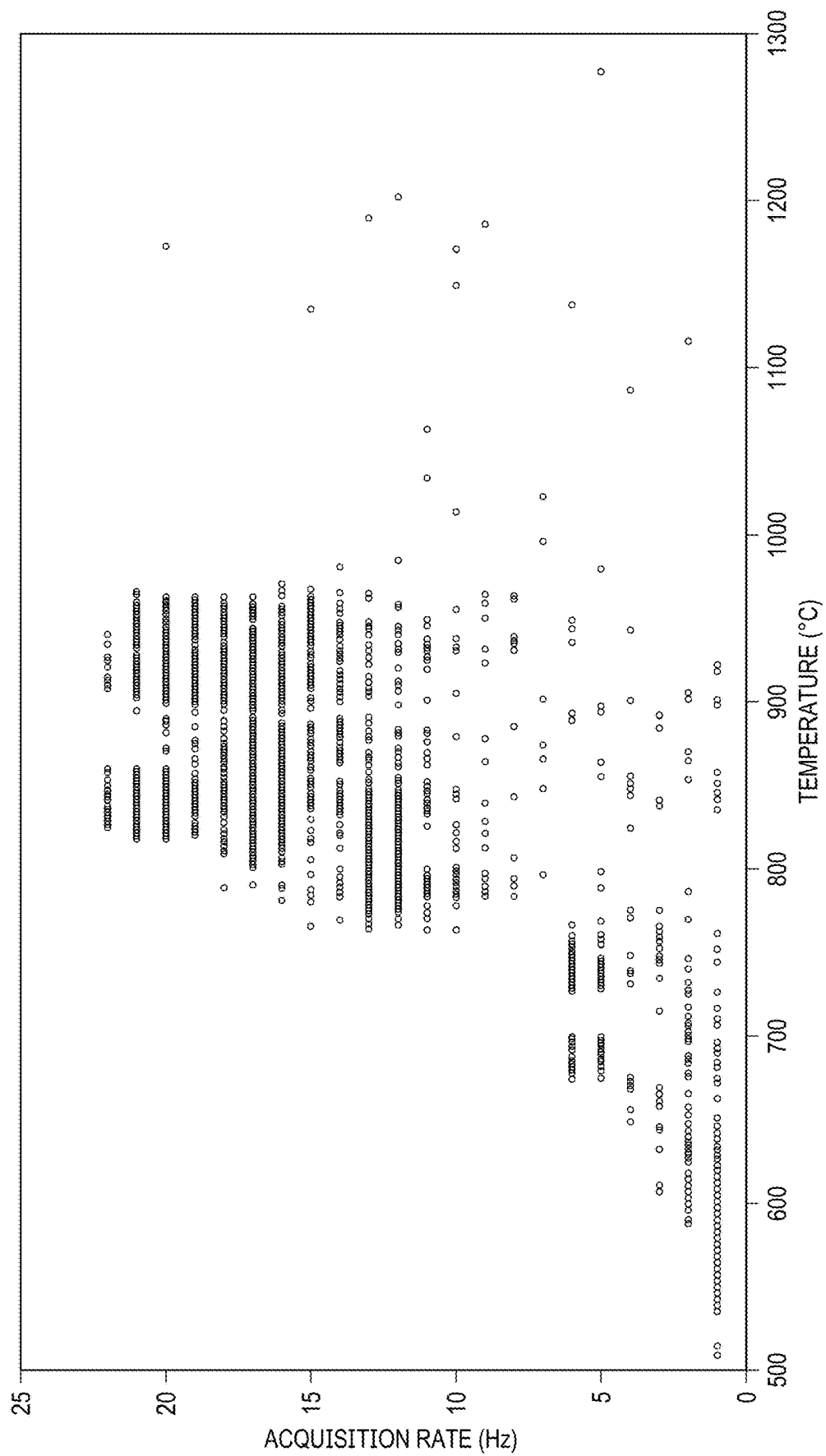
FIG. 13 depicts a graph illustrating the temperature dependence of acquisition rate in accordance with an illustrative embodiment.
Figure 14:
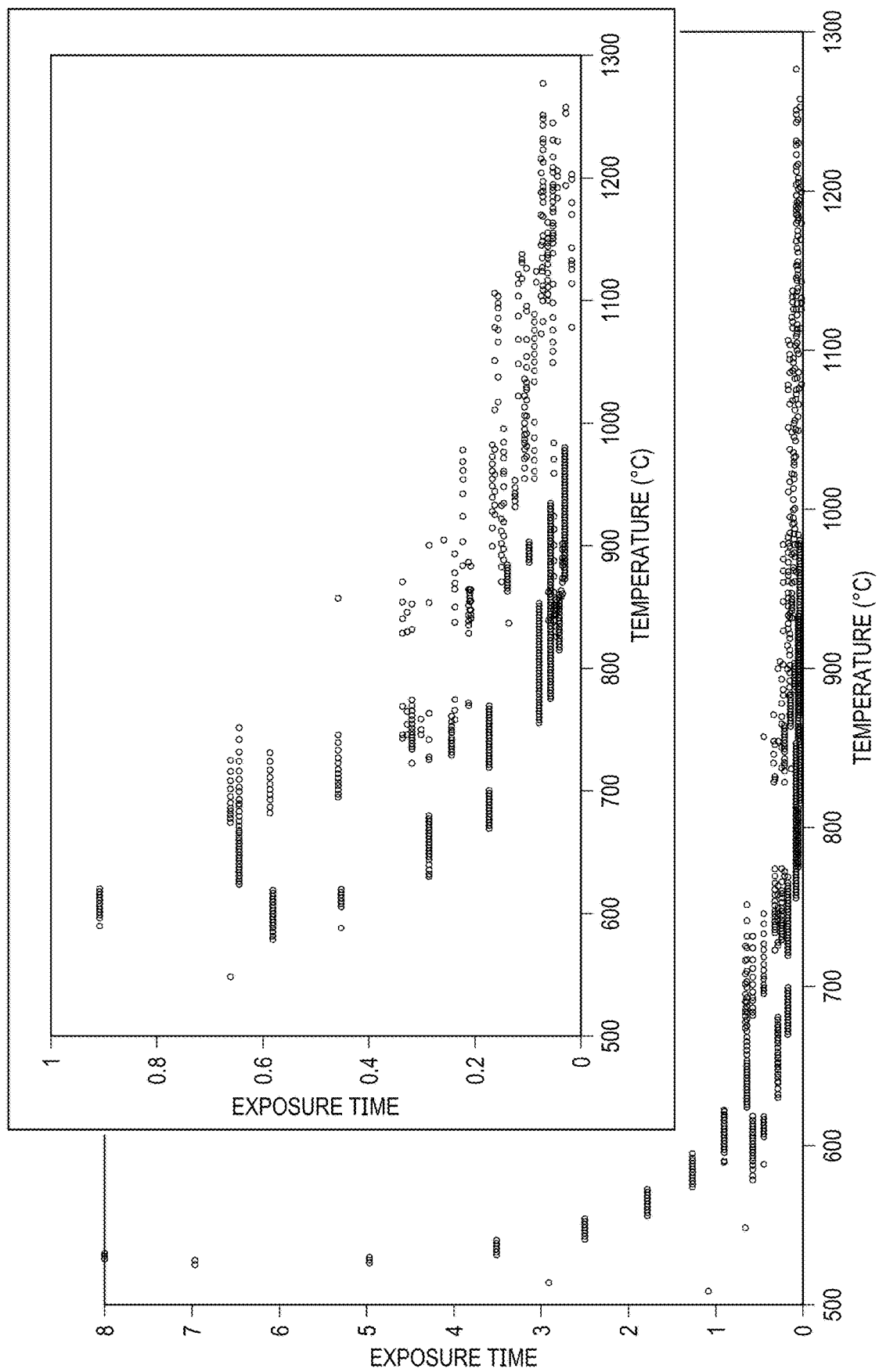
FIG. 14 depicts a graph illustrating the temperature dependence of exposure time in accordance with an illustrative embodiment.
Figure 15A:
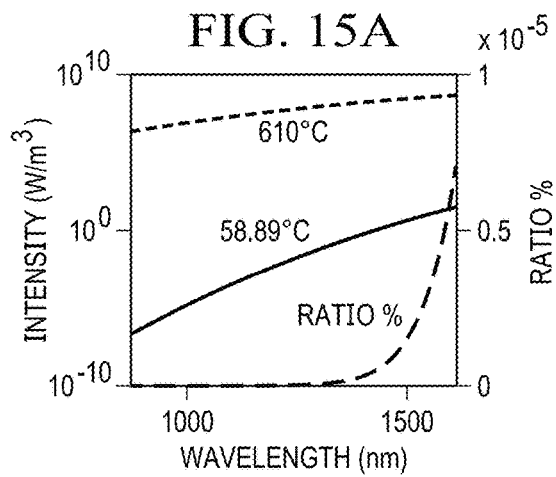
FIG. 15A depicts a graph illustrating a comparison of Planck intensity curves over the working wavelength of the multi-wavelength pyrometer for the temperatures shown at a first preheating step in accordance with an illustrative embodiment.
Figure 15B:
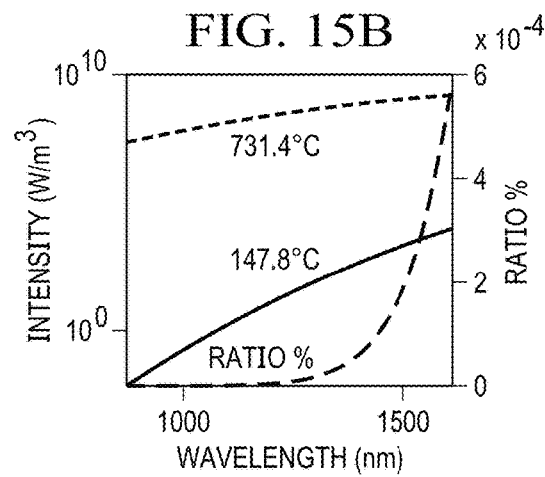
FIG. 15B depicts a graph illustrating a Planck intensity curve over the working wavelength of the multi-wavelength pyrometer for the temperatures shown at a second preheating step in accordance with an illustrative embodiment.
Figure 15C:
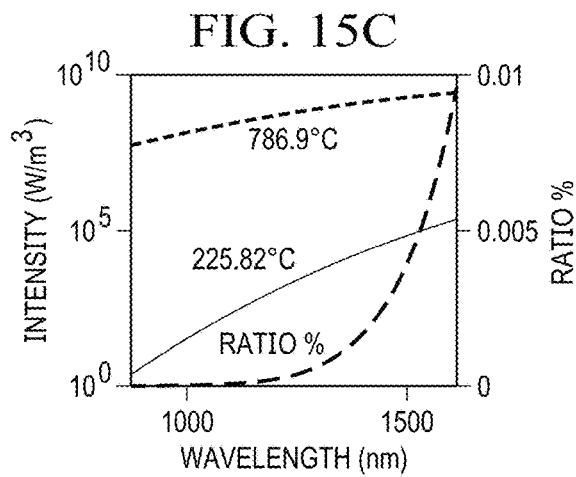
FIG. 15C depicts a graph illustrating a Planck intensity curve over the working wavelength of the multi-wavelength pyrometer for the temperatures shown at a third preheating step in accordance with an illustrative embodiment.
Figure 15D:
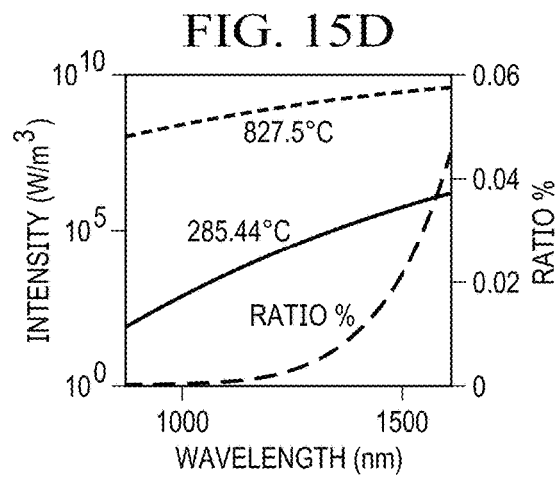
FIG. 15D depicts a graph illustrating a Planck intensity curve over the working wavelength of the multi-wavelength pyrometer for the temperatures shown at a fourth preheating step in accordance with an illustrative embodiment.
Figure 15E:
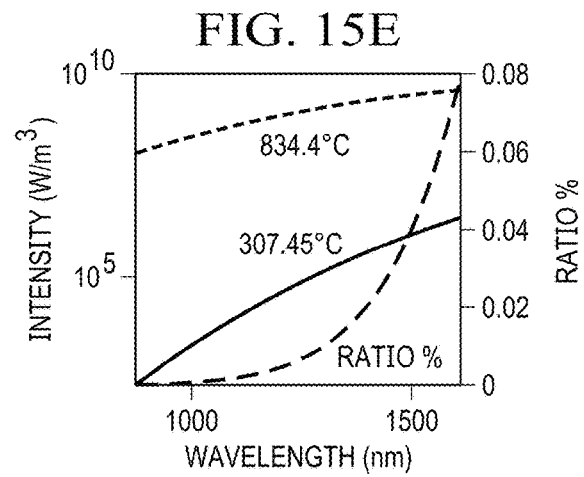
FIG. 15E depicts a graph illustrating a Planck intensity curve over the working wavelength of the multi-wavelength pyrometer for the temperatures shown at a fifth preheating step in accordance with an illustrative embodiment.
Figure 15F:
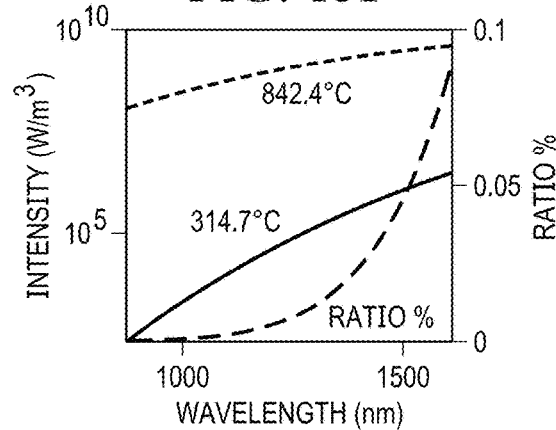
FIG. 15F depicts a graph illustrating a Planck intensity curve over the working wavelength of the multi-wavelength pyrometer for the temperatures shown at a sixth preheating step in accordance with an illustrative embodiment.
Figure 15G:
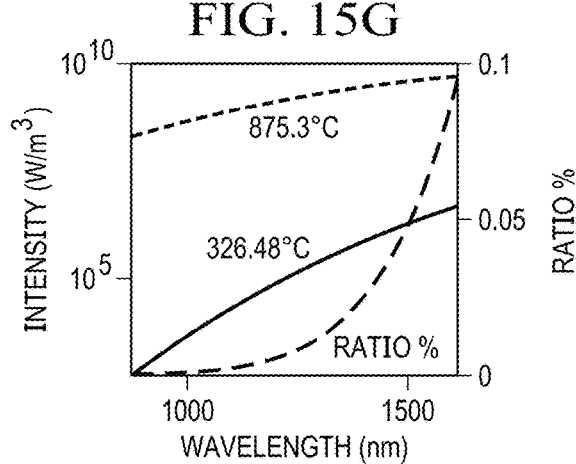
FIG. 15G depicts a graph illustrating a Planck intensity curve over the working wavelength of the multi-wavelength pyrometer for the temperatures shown at a seventh preheating step in accordance with an illustrative embodiment.
Figure 15H:
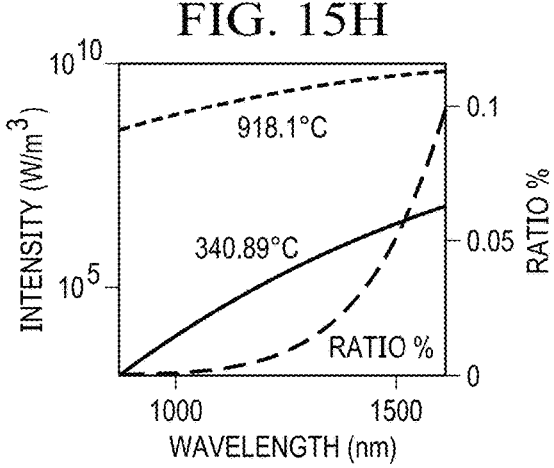
FIG. 15H depicts a graph illustrating a Planck intensity curve over the working wavelength of the multi-wavelength pyrometer for the temperatures shown at an eighth preheating step in accordance with an illustrative embodiment.
Figure 15I:
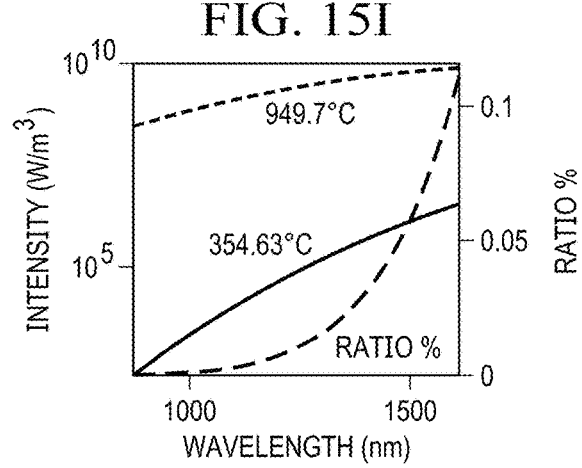
FIG. 15I depicts a graph illustrating a Planck intensity curve over the working wavelength of the multi-wavelength pyrometer for the temperatures shown at a ninth preheating step in accordance with an illustrative embodiment.
Figure 16A:
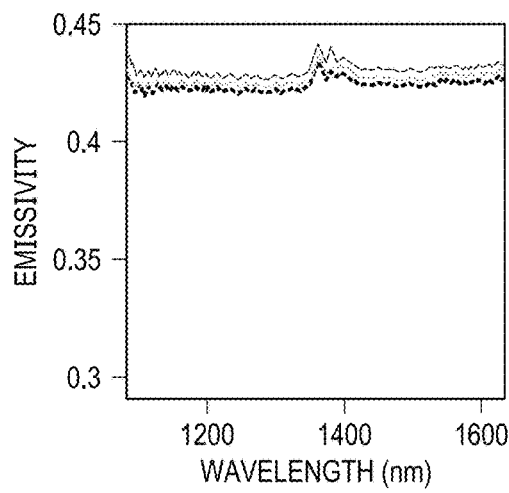
FIG. 16A depicts a graph illustrating spectral emissivity plots for the first preheating step, in accordance with an illustrative embodiment.
Figure 16B:
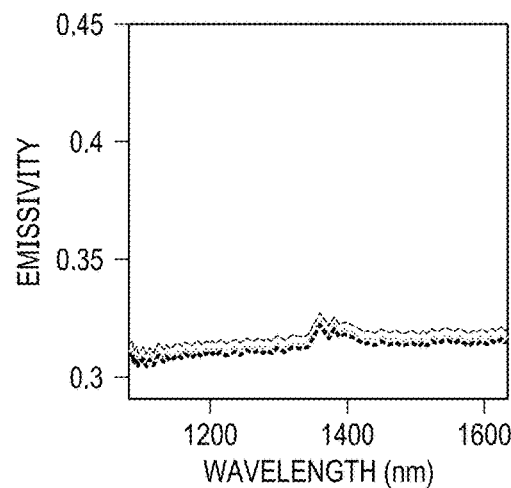
FIG. 16B depicts a graph illustrating spectral emissivity for a second preheating step in accordance with an illustrative embodiment.
Figure 16C:
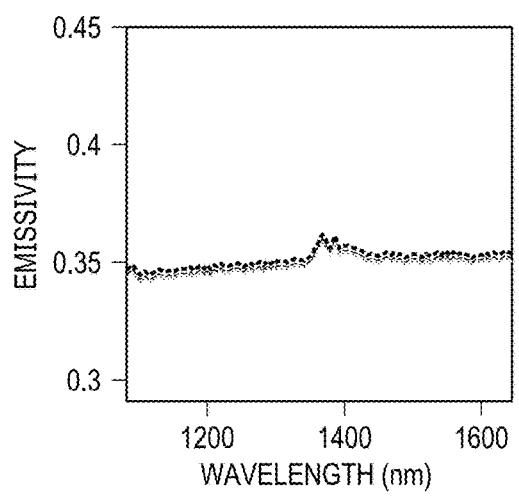
FIG. 16C depicts a graph illustrating spectral emissivity for a third preheating step in accordance with an illustrative embodiment.
Figure 16D:
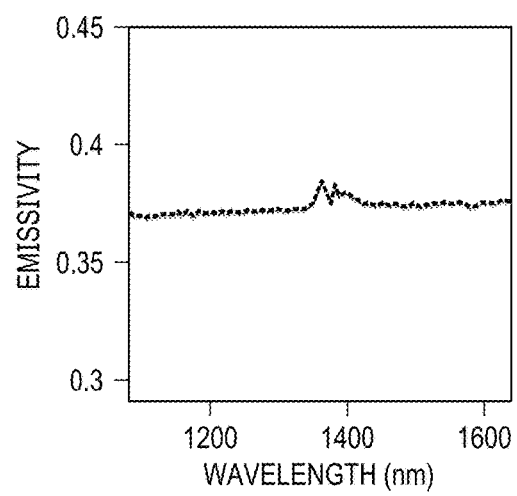
FIG. 16D depicts a graph illustrating spectral emissivity for a fourth preheating step in accordance with an illustrative embodiment.
Figure 16E:
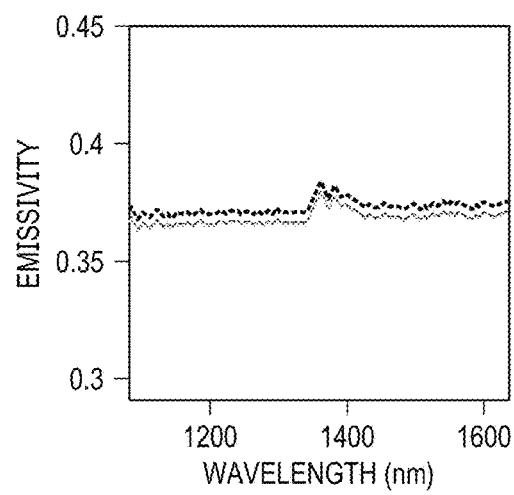
FIG. 16E depicts a graph illustrating spectral emissivity for a fifth preheating step in accordance with an illustrative embodiment.
Figure 16F:
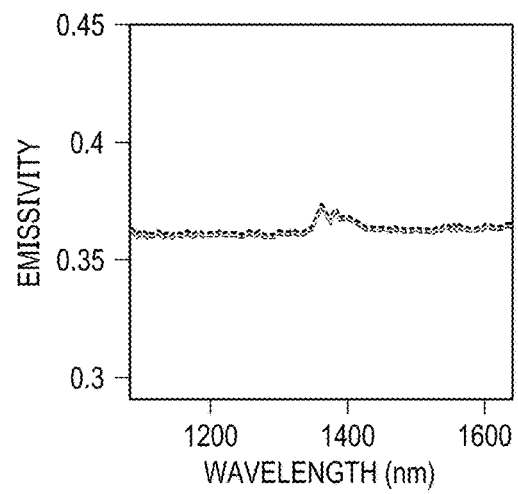
FIG. 16F depicts a graph illustrating spectral emissivity for a sixth preheating step in accordance with an illustrative embodiment.
Figure 16G:
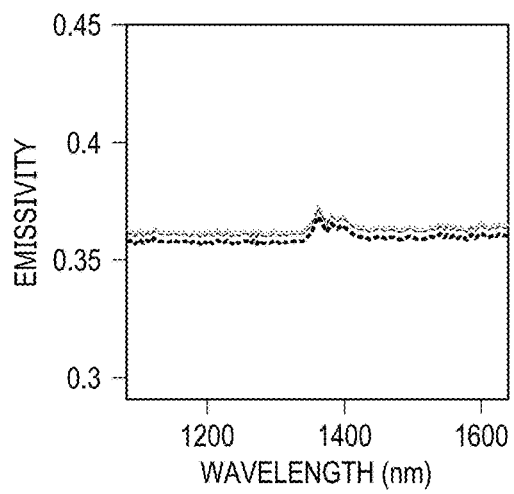
FIG. 16G depicts a graph illustrating spectral emissivity for a seventh preheating step in accordance with an illustrative embodiment.
Figure 16H:
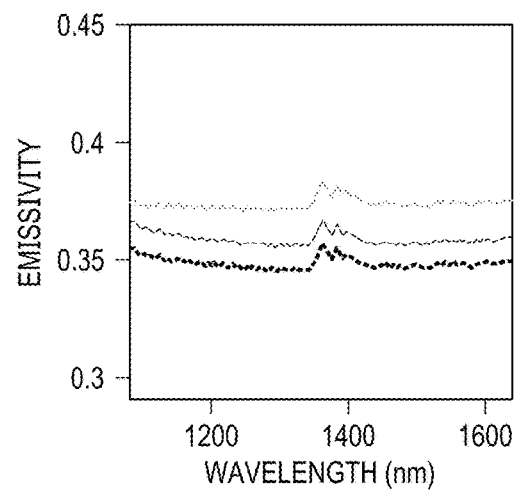
FIG. 16H depicts a graph illustrating spectral emissivity for an eighth preheating step in accordance with an illustrative embodiment.
Figure 16I:
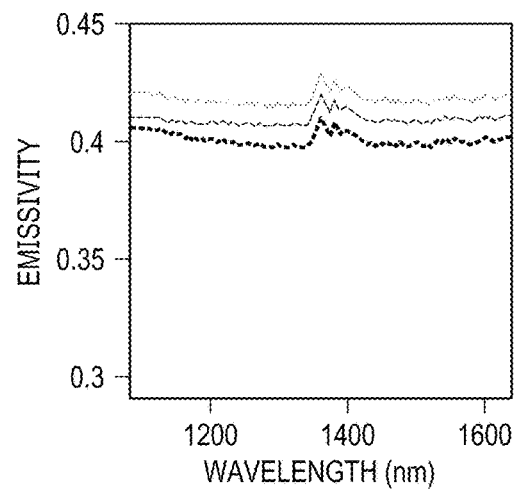
FIG. 16I depicts a graph illustrating spectral emissivity for a ninth preheating step in accordance with an illustrative embodiment.

FIG. 13 depicts a graph illustrating the temperature dependence of acquisition rate in accordance with an illustrative embodiment. FIG. 14 depicts a graph illustrating the temperature dependence of exposure time in accordance with an illustrative embodiment. FIGS. 13 and 14 show the temperature dependence of both exposure time and acquisition rate and how they both are affected by the temperature, and hence intensity of the target. The exposure time exhibited in FIG. 12B varies according to an embedded algorithm of the FMPI pyrometer that determines the optimal exposure time based on an acceptable signal-to-noise ratio.

The overall acquisition rates obtained in the experiment were as low as ~2 measurements per second at relatively low temperatures (~600° C.) to ~23 measurements per second at the highest temperatures measured H900° C.) as shown in FIGS. 13 and 14. Correspondingly, the acquisition rates during melting spanned from ~3 to 20 measurements per second in the temperature range from 1000° C. to 1200° C. As demonstrated in FIGS. 11A and 11C, the frequency response of the FMPI pyrometer effectively measures the surface temperature during the beam scan. Ongoing improvements will be incorporated to expand the hardware and software capabilities of the FMPI to maximize acquisition rate (possibly exploiting its 4 µs exposure time to provide >100 kHz acquisition rates) to more fully capture the heating, solidification, and cooling phenomena experienced in PBF.

Type-K thermocouples were used to take temperature measurements of one of the side walls and the front wall of the heat shield enclosure of the Arcam A2 system. The plot for the temperatures for the heat shields is shown in the two light gray plots in FIG. 11A indicating that the temperature peaked at ~354° C., similar to the temperatures measured for Ti6Al4V in. Given the relatively low temperatures reached by the heat shield walls (FIG. 11A), it is expected that their contribution is small in the measurements obtained. The study by Ruffino used ratio pyrometry to measure hot spots of a surface under non-isothermal planar conditions and the influence of cooler spots. Ruffino's results indicated that the radiative effects in the measured temperatures due to spots of the surface at lower temperatures could be considered negligible until both temperatures approached ~200° C., otherwise introducing errors in measurements that were below a single digit temperature. In the current embodiments, the contribution from the heat shields can be assumed negligible as the temperature difference between the target and the heat shield walls exceeded 400° C. during the length of the experiment, as shown by FIG. 11A.

FIGS. 15A-15I depict graphs illustrating Planck intensity curves over the working wavelength of the FMPI pyrometer for the temperatures shown over nine preheating steps in accordance with an illustrative embodiment. The set of plots in FIGS. 15A-15I show the ratios of intensity contribution at each preheating step, using the median temperatures in Table 2 for the pyrometer and the corresponding temperatures for the heat shields. The plots indicate the spectral or wavelength dependency of the ratios. Temperature values are shown for reference only.

The maximum ratio of contribution was ~0.125% belonging to the ninth preheating step (at the corresponding powder bed temperature of 934.8° C.). This contribution is considered negligible since the theoretical contribution of 1% of the ratio to the maximum temperatures measured was calculated to be ~5° C. This contribution could be included when considering more accurate surface temperature measurements, following the method outlined in.

FIGS. 16A-16I depict charts illustrate the spectral emissivity plots for each of the 9 preheating steps, in accordance with an illustrative embodiment. The charts illustrate the temporal variation of the emissivity during processing. Three spectrums are shown corresponding to three temperatures occurring at three points in time during the preheating step. This work has established the variation of the emissivity for the heated copper powder over the spectral range from 1080-1640 nm as temperature was increased through electron beam preheating. The spectral emissivity plots (shown in FIGS. 16A-16I) indicate that the emissivity was spectrally (i.e. wavelength) and temporally dependent, and it also indicated the non-graybody behavior for the copper powder used. The temporal dependence is evident in the plots for preheating steps 8, and 9 (FIGS. 16H and 16I), where large variations in the measured emissivity spectrums are observed for the three sampled temperatures at each preheating step. These variations were measured in the range from 10% to 15% when comparing individual values in the three spectrums of a given plot. For the rest of the preheating steps (i.e. FIGS. 16A-16G), the emissivity values are clustered within tighter ranges and they exhibit reduced variance. The variations in emissivity might be attributed to changes in the chemical composition of the target or could even indicate the start of coalescence and sintering of the powder. Further characterization is still needed to confirm the occurrence of these effects, but it should be noted that this technique may provide a useful method for identifying particle sintering.

The plots on emissivity in FIGS. 16A-16I at the wavelength range from ~1340 nm to ~1425 nm show a similar increase in emissivity measured in this range (represented as a double peak). This feature is a result of the calibration that was conducted in air (with humidity or water vapor) before the experiments inside the Arcam A2 (in vacuum). The decrease in transmission provided by water vapor in the environment at that wavelength range is well described in. The increase in radiation in the evacuated Arcam machine results in the double peaks for the emissivity plot over that wavelength range. Although the corrected intensity and the spectral emissivity plots calculated by the instrument exhibit these peaks, the wavelength intensity pairs in this range do not affect the accuracy of the temperature measurements since they do not fall within the polynomial fit of the Planckian curve, and are thus discarded from the calculation as detailed by the manufacturer of the FMPI pyrometer.

Figure 17:
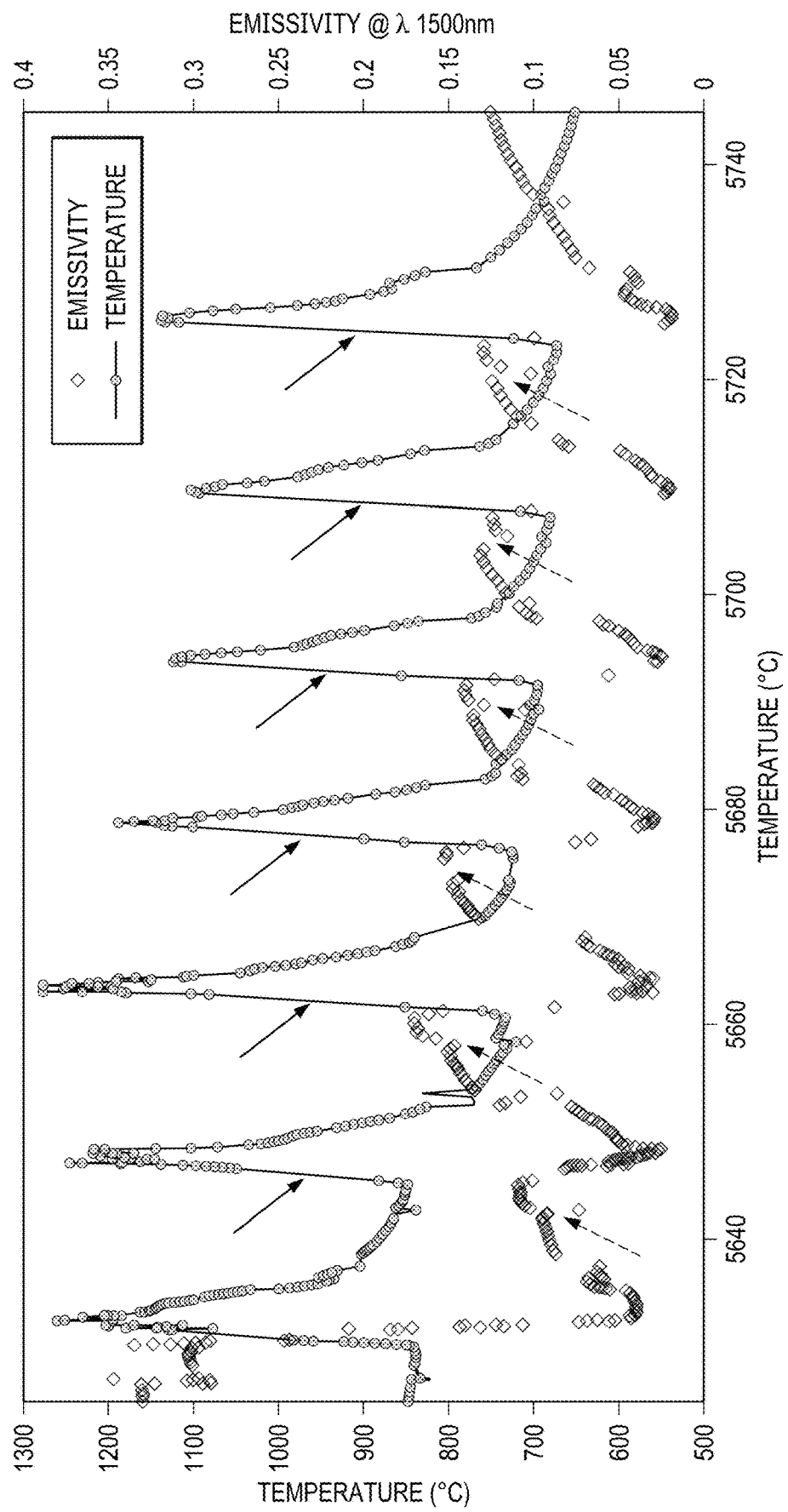
FIG. 17 depicts a graph illustrating temperature and emissivity signals at a 1500 nm wavelength obtained by the multi-wavelength pyrometer during the seven melt steps in accordance with an illustrative embodiment.
Figure 18:
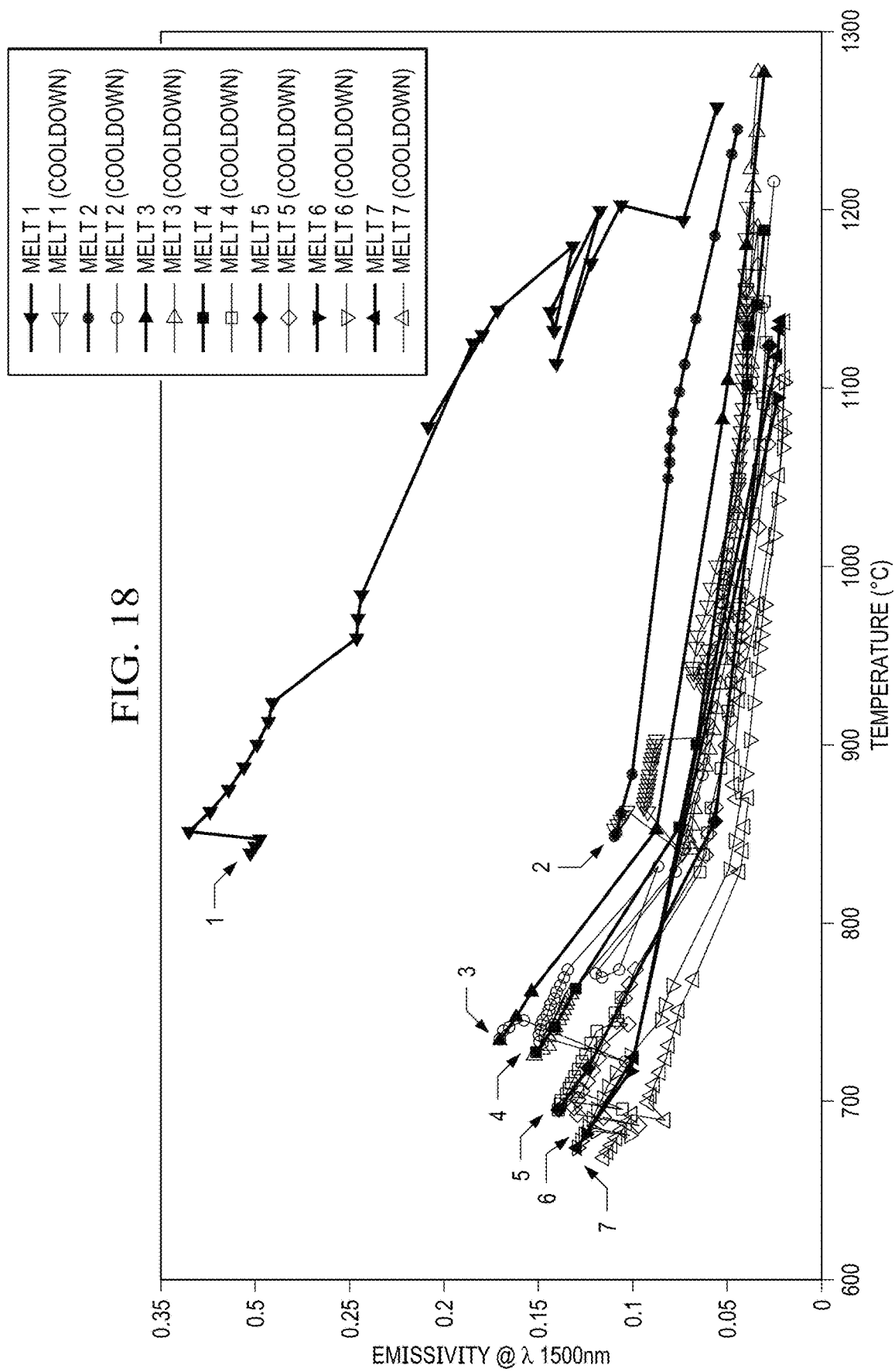
FIG. 18 depicts a graph illustrating the excursions of emissivity as function of temperature at 1500 nm during the seven melt steps in accordance with an illustrative embodiment.

Melting was induced in seven consecutive steps with no powder deposition and the time-dependent measured surface temperatures and emissivities (at 1500 nm) are shown in FIGS. 17 and 18, respectively. The emissivity values in the figure show quite remarkably the variation of emissivity throughout the melting, solidification, and cooling process, showing emissivity values of ~0.3 before the initial melt event (i.e., starting with the sintered powder after the preheating steps) and then varying between ~0.025 and ~0.15 during the subsequent melt events (melting, solidification, cooling). FIG. 17 shows an almost mirrored behavior between the temperature and emissivity plots in which the minima values for emissivity (valleys) coincide with the maxima temperature values (peaks). Assuming the peak temperature corresponds with liquid phase (molten) copper and the minimum emissivity values correspond with solidified copper, these data can be roughly compared with the published data of for molten copper and for solid copper. Prior to every melt event, a discontinuity is observed in the temperature and emissivity values measured (as indicated by black arrows FIG. 17); this is a feature of the exposure time algorithm as referenced before. Also, a drop in the emissivity values shown in FIG. 17 (indicated in by gray arrows), is attributed to the rake mechanism moving across and interfering with the measurements.

FIG. 18 shows the plot of emissivity (reported at $\lambda=1500$ nm) vs temperature in which individual melt events have been indicated with different markers (legend in FIG. 18) whereas the heating up and cooling down stages for each melt are indicated in solid black and gray lines, respectively. As seen in this plot, the initial phase transition, induced by the first melt event, is indicated in the excursion for the values of emissivity starting at ~0.35 at a temperature of ~850° C., followed by a progressive drop to ~0.05 at the highest temperature exceeding 1250° C. (FIG. 18), as indicated by plotted lines with a simple cross marker. The successive six melts are indicated in the plots with different markers during heating up (black lines) and cooling down (gray lines). It is noteworthy to mention that the trends followed by the plots describing the emissivity excursion for the last six melts (FIG. 18) are consistent with data previously reported for copper in the polished and roughened condition under steady temperature conditions. The plots for the last six melts in FIG. 18 indicate the emissivity makes excursions from below 0.05 during temperature peaks, to values approaching ~0.15 upon cooling down to ~700° C. The emissivity values in the plot for the first melt in FIG. 18 indicate the FMPI's ability to capture the phase transition as the copper powder undergoes melting and solidification. After this first melt event, the similarity of the remaining emissivity plots in FIG. 18 also indicate the consistency of the emissivity and temperature measurements obtained by the FMPI pyrometer.

Figure 19:
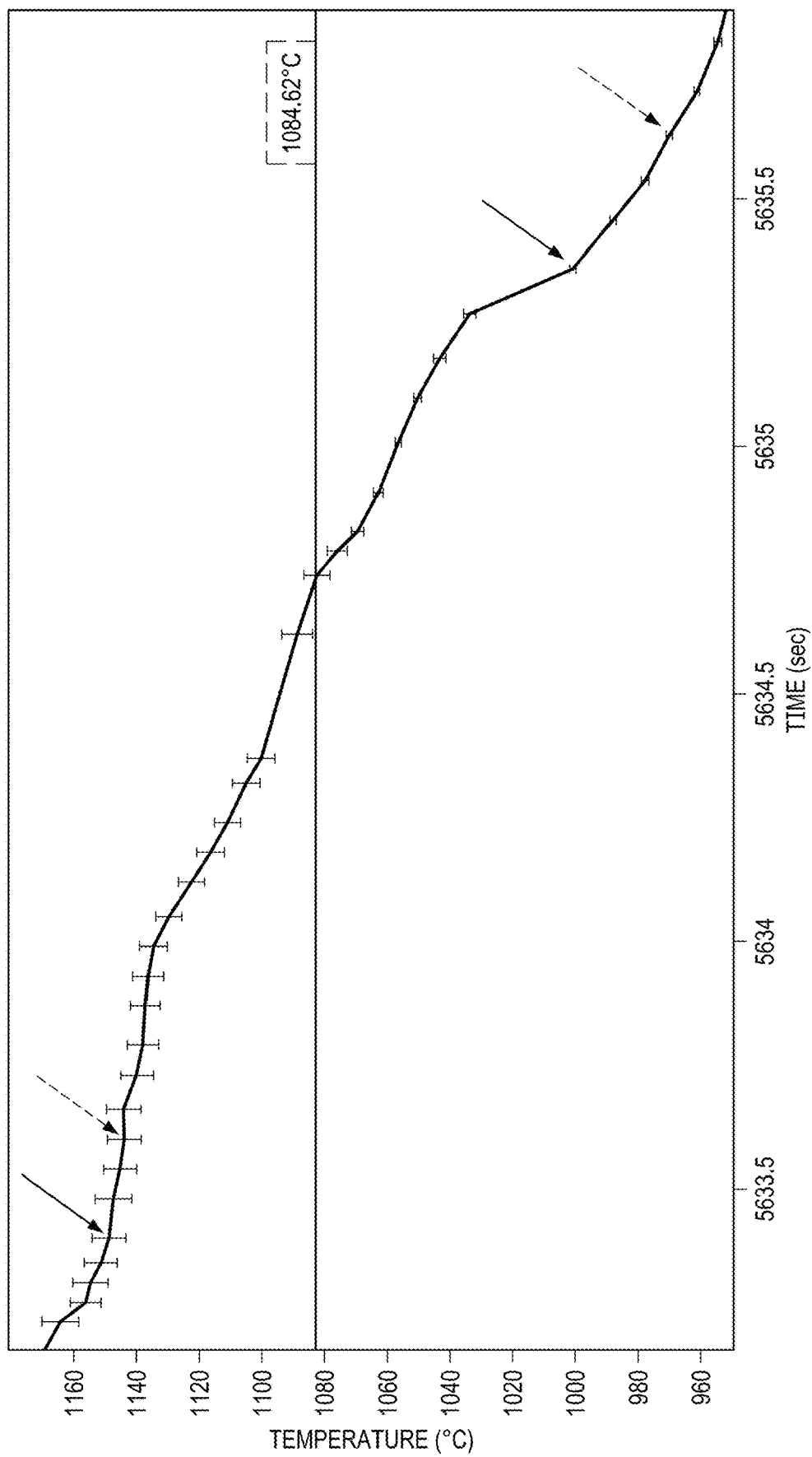
FIG. 19 depicts a graph illustrating decaying temperature for the first melt with standard deviation error bars in accordance with an illustrative embodiment.
Figure 20A:
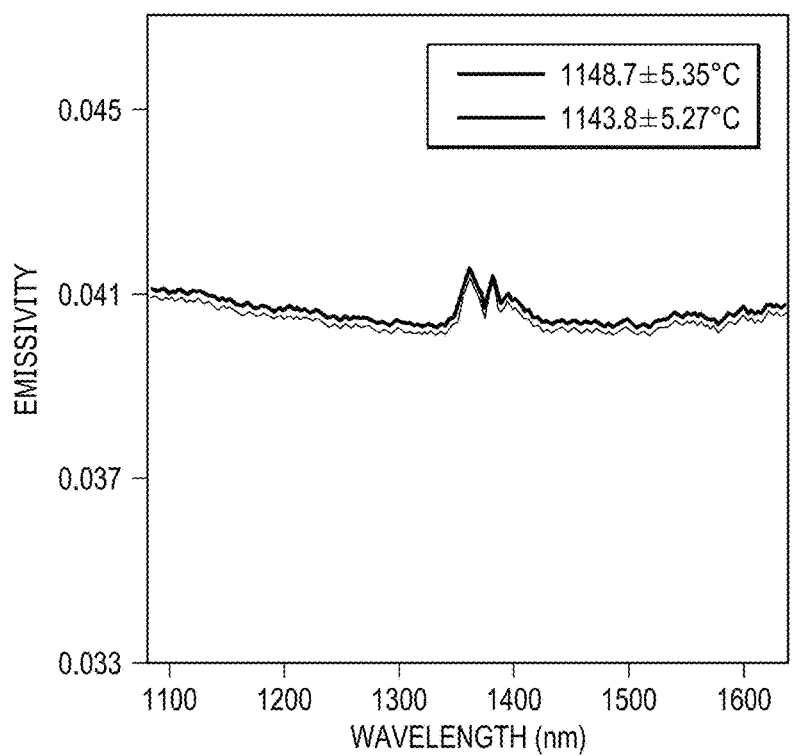
FIG. 20A depicts a graph illustrating spectral emissivity plots for selected temperatures above the melting temperature of copper in accordance with an illustrative embodiment.
Figure 20B:
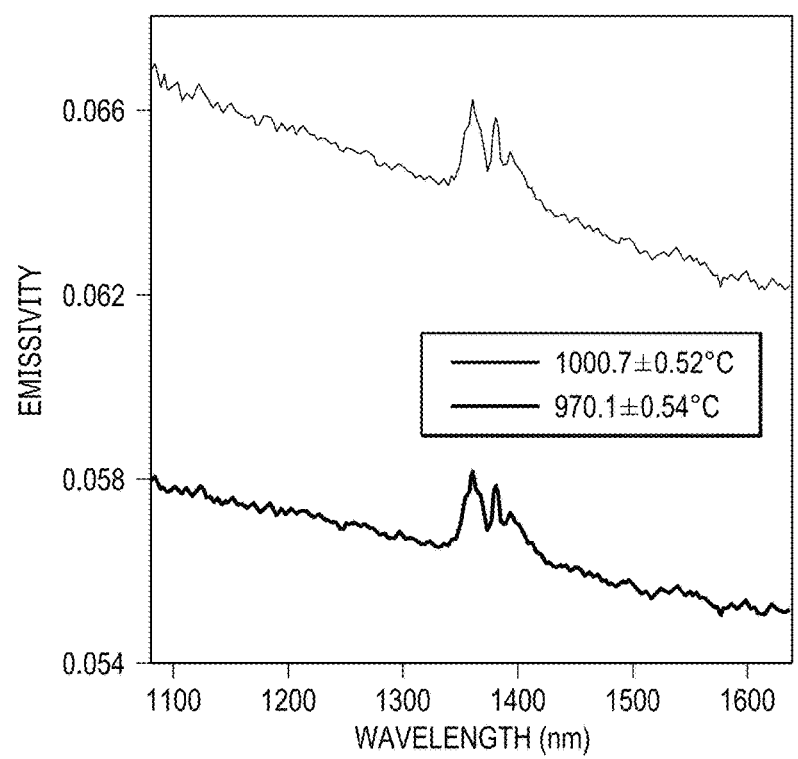
FIG. 20B depicts a graph illustrating spectral emissivity plots for selected temperatures below the melting temperature of copper in accordance with an illustrative embodiment.

FIG. 19 shows the temperature decrease (i.e. cooling) following the first melt event, with error bars indicating the standard deviation as calculated by the FMPI pyrometer for each data point. The horizontal line in the figure indicates the melting point for copper (~1084° C.), used to simply indicate a possible phase transition in the region of this temperature. The standard deviation above the melting point of copper is ~6° C., and it drops to <1° C. below the melting point. The difference in standard deviation is attributed to the FMPI pyrometer likely observing multiple coexisting phases (i.e. powder, liquid, and solidified copper), given the relative large size of the measurement spot compared to the melt pool, leading to high standard deviation values. Below the melting point line, the low standard deviations in the measurements suggest the material has transitioned to the solid phase and is experiencing slower cooling conditions, compared with the rapid non-equilibrium solidification during melting, hence the reduced standard deviations for the temperatures measured. The plots in FIGS. 20A and 20B show the spectral emissivity for the temperatures color coded and indicated by arrows (two above and two below the melting point) in FIG. 19. For the two temperatures indicated above the melting point (i.e. 1145° C.), emissivity exhibits a near graybody behavior, with a variation of ~2% (FIG. 20A), within the 1080-1640 nm spectrum. However, the spectral emissivity variation (1080-1640 nm) is more drastic for the temperatures below the melting point resulting in ~7% differences when comparing the values at 1000.7° C. and 970.1° C. (FIG. 20B). FIG. 20B demonstrates the non-graybody behavior in addition to the well-known temperature dependence of emissivity for the copper material used in this study.

Existing literature in PBF AM has not directly addressed the non-graybody behavior of materials under representative processing conditions over a large spectral range, as presented in the current work. This is due, in part, to the current practice in the AM community to use radiation thermometry devices with limited spectral range capabilities, that are unable to capture the spectral response of targets, or those that rely on prior knowledge of the emissivity including IR cameras, single-color, and two-wavelength pyrometers. Specifically, for two-wavelength pyrometers, the inability of such approaches to capture a more complete view of the spectral behavior of the materials during PBF processing could intrinsically limit accuracy of the devices. For example, a calculation using the ratio pyrometry equation can be used to demonstrate some possible errors from using this approach to measure temperature for the experiment described here. Using the emissivity values captured in FIG. 9*b*) and c) at 1300 nm and 1500 nm (assuming these as the two discrete wavelengths of a two-wavelength pyrometer) would lead to only ~1-2° C. difference for the emissivity values in FIG. 20A but ~20° C. difference at 970.1° C. in FIG. 20B. This simple example is intended to show that the full spectral dependence of emissivity over the temperatures, phases, and processing conditions experienced in PBF is required to better use and apply thermal signature measurement techniques commonly used in the PBF. The methods and systems described here can be used to extend the illustrative results provided above to materials commonly used in PBF, such as Ti6Al4V, Inconel 718, and many others.

This work has presented a novel method using a MW pyrometer for in situ acquisition of thermal signatures from a small region of a powder bed that was gradually heated up, in a total of nine steps, then melted in a series of seven successive melting steps, using electron beam scanning in a commercial EB-PBF Arcam A2 system. The method implemented a setup including a vacuum rated tube that enabled near continuous measurements using the MW pyrometer, and it also demonstrated the negligible effect of reflections from the radiative environment on the measurements obtained. One illustrative embodiment from this work is the overall method for measuring spectral emissivity of materials being processed in PBF with measurements performed during actual PBF processing (experiencing heating, sintering, melting, solidification, and cooling). The method was demonstrated on a copper powder for which the spectral (wavelength range from 1080-1640 nm) and temporal dependence of emissivity was measured in EB-PBF. The spectral and temporal dependence for copper was captured while holding a near-constant temperature in each preheating step. This also indicates the temperature dependence of emissivity. All this behavior was captured in plots that showed that emissivity values ranged from ~0.30 to ~0.45 and exhibited a variance anywhere from 10-16%. The plots also clearly indicated the non-graybody behavior of the material. Also, the emissivity change was measured across the phase change during melting and cooling of the material, indicating that emissivity was nearly constant (gray) above the melting point, but the material exhibited very non-gray behavior in the cooling region.

This complex behavior of emissivity found for copper, a feature that is likely true for most other metals processed using PBF AM, points to a major challenge in PBF AM in the application of non-contact temperature measurement methods for measuring accurate surface temperatures. These results highlighted some of the potential shortfalls in temperatures reported using non-contact radiation thermometry methods (such as two-color pyrometers and IR cameras) in current literature. Further demonstrations can be used to more fully establish the range of spectral response of emissivity for the many other materials used in PBF, and advancements to the multi-wavelength pyrometer can be implemented to improve the acquisition rate of the MW pyrometer system used in this study that could also include expanding the spectral range of the sensor as well as other instrument and experimental procedure improvements. However, the setup and procedures described in this work can be immediately applied to other more commonly used materials in PBF to help establish the spectral emissivity of these materials during PBF processing.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of measuring spectral emissivity of materials, the method comprising:
    placing material in a controlled chamber;
    exposing the material to an energy source to heat the material; and
    measuring, with a multi-wavelength pyrometer, the spectral emissivity of the material produced by heating by the energy source, wherein the multi-wavelength pyrometer is positioned at a distal end of a tube extending from the chamber, wherein the tube provides a sacrificial surface for vapor condensation to prevent the vapor condensation from obscuring a viewport sealed to the distal end of the tube used by the pyrometer, wherein the vapor condenses on the sacrificial surface before reaching the viewport at the distal end of the tube.

2. The method of claim 1, wherein the material comprises at least one of:
    a powder;
    a solid material; or
    a liquid material.

3. The method of claim 1, wherein the material comprises at least one of:
    a metal;
    a metal alloy;
    composite metal material; or
    ceramic material.

4. The method of claim 1, wherein the controlled chamber is configured for powder bed fusion.

5. The method of claim 1, wherein the energy source comprises:
    an electron beam;
    a laser;
    resistance heating; or
    induction heating.

6. The method of claim 1, further comprising measuring a thermal signature of a powder bed with an infrared camera in conjunction with the multi-wavelength pyrometer.

7. The method of claim 1, wherein the energy source comprises an energy beam, and wherein the multi-wavelength pyrometer is sighted:
    off-axis from the energy beam; or
    on-axis with the energy beam.

8. The method of claim 1, wherein the energy source is a laser, and wherein the multi-wavelength pyrometer is calibrated to filter a range of wavelengths emitted by the laser.

9. The method of claim 1, wherein the controlled chamber is vacuum controlled.

10. The method of claim 1, wherein the controlled chamber is filled with an inert gas.

11. The method of claim 1, wherein the spectral emissivity of the material is measured during heating of the material.

12. The method of claim 1, wherein the viewport comprises quartz glass.

13. The method of claim 1, further comprising pre-heating the material with a defocused electron beam using a snake pattern that alternates in direction.

14. A method of measuring temperature of materials, the method comprising:
    placing material in a controlled chamber;
    exposing the material to an energy source to heat the material; and
    measuring, with a multi-wavelength pyrometer, emitted thermal radiation from the material produced by heating by the energy source, wherein the multi-wavelength pyrometer is positioned at a distal end of a tube extending from the chamber, wherein the tube provides a sacrificial surface for vapor condensation to prevent the vapor condensation from obscuring a viewport sealed to the distal end of the tube used by the multi-wavelength pyrometer, wherein the vapor condenses on the sacrificial surface before reaching the viewport at the distal end of the tube.

15. The method of claim 14, wherein the material comprises at least one of:
    a powder;
    a solid material; or
    a liquid material.

16. The method of claim 14, wherein the material comprises at least one of:
- a metal;
- a metal alloy;
- composite metal material; or
- ceramic material.

17. The method of claim 14, wherein the controlled chamber is configured for powder bed fusion.

18. The method of claim 14, wherein the energy source comprises:
- an electron beam;
- a laser;
- resistance heating; or
- induction heating.

19. The method of claim 14, further comprising measuring a thermal signature of a powder bed with an infrared camera in conjunction with the multi-wavelength pyrometer.

20. The method of claim 14, further comprising preheating the material with a defocused electron beam using a snake pattern that alternates in direction.

* * * * *